(12) United States Patent
Yun et al.

(10) Patent No.: US 12,360,067 B2
(45) Date of Patent: Jul. 15, 2025

(54) X-RAY FLUORESCENCE SYSTEM AND X-RAY SOURCE WITH ELECTRICALLY INSULATIVE TARGET MATERIAL

(71) Applicant: Sigray, Inc., Concord, CA (US)

(72) Inventors: Wenbing Yun, Walnut Creek, CA (US); Benjamin Donald Stripe, Walnut Creek, CA (US); Frances Yenan Su, Walnut Creek, CA (US); Vikaram Singh, Concord, CA (US); Sylvia Jia Yun Lewis, San Francisco, CA (US); Janos Kirz, Berkeley, CA (US)

(73) Assignee: Sigray, Inc., Benicia, CA (US)

( * ) Notice: Subject to any disclaimer, the term of this patent is extended or adjusted under 35 U.S.C. 154(b) by 149 days.

(21) Appl. No.: 18/175,171

(22) Filed: Feb. 27, 2023

(65) Prior Publication Data

US 2023/0280291 A1   Sep. 7, 2023

Related U.S. Application Data

(60) Provisional application No. 63/268,778, filed on Mar. 2, 2022.

(51) Int. Cl.
G01N 23/223     (2006.01)
G01N 23/2204    (2018.01)
H01J 35/08      (2006.01)

(52) U.S. Cl.
CPC ....... *G01N 23/223* (2013.01); *G01N 23/2204* (2013.01); *H01J 35/112* (2019.05);
(Continued)

(58) Field of Classification Search
None
See application file for complete search history.

(56) References Cited

U.S. PATENT DOCUMENTS 1,203,495 A   10/1916   Coolidge
1,211,092 A    1/1917   Coolidge
(Continued)

FOREIGN PATENT DOCUMENTS

CN   1656373 A   8/2005
CN   1829910 A   9/2006
(Continued)

OTHER PUBLICATIONS

"High performance benchtop EDXRF spectrometer with Windows®® software," published by: Rigaku Corp., Tokyo, Japan; 2017.
(Continued)

*Primary Examiner* — Thomas R Artman
(74) *Attorney, Agent, or Firm* — Knobbe, Martens, Olson & Bear, LLP

(57) ABSTRACT

A system includes a stage for supporting a sample having at least first and second atomic elements. The first atomic element has a first characteristic x-ray line with a first energy and the second atomic element has a second characteristic x-ray line with a second energy, the first and second energies lower than 8 keV and separated from one another by less than 1 keV. The system further includes an x-ray source of x-rays having a third energy between the first and second energies and at least one x-ray optic configured to receive and focus at least some of the x-rays as an x-ray beam to illuminate the sample. The system further includes at least one x-ray detector configured to detect fluorescence x-rays produced by the sample in response to being irradiated by the x-ray beam.

21 Claims, 8 Drawing Sheets

(52) U.S. Cl.
CPC ............ G01N 2223/076 (2013.01); G01N 2223/1016 (2013.01); G01N 2223/204 (2013.01); G01N 2223/206 (2013.01); H01J 2235/081 (2013.01); H01J 2235/084 (2013.01)

(56) References Cited

U.S. PATENT DOCUMENTS

| | | |
|---|---|---|
| 1,215,116 A | 2/1917 | Coolidge |
| 1,328,495 A | 1/1920 | Coolidge |
| 1,355,126 A | 10/1920 | Coolidge |
| 1,790,073 A | 1/1931 | Pohl |
| 1,917,099 A | 7/1933 | Coolidge |
| 1,946,312 A | 2/1934 | Coolidge |
| 2,926,270 A | 2/1960 | Zunick |
| 3,795,832 A | 3/1974 | Holland |
| 3,894,239 A | 7/1975 | Braun |
| 4,165,472 A | 8/1979 | Wittry |
| 4,169,228 A | 9/1979 | Briska et al. |
| 4,192,994 A | 3/1980 | Kastner |
| 4,227,112 A | 10/1980 | Waugh et al. |
| 4,266,138 A | 5/1981 | Nelson et al. |
| 4,523,327 A | 6/1985 | Eversole |
| 4,573,186 A | 2/1986 | Reinhold |
| 4,642,811 A | 2/1987 | Georgopoulos |
| 4,945,552 A | 7/1990 | Ueda |
| 4,951,304 A | 8/1990 | Piestrup et al. |
| 4,972,449 A | 11/1990 | Upadhya et al. |
| 5,132,997 A | 7/1992 | Kojima |
| 5,148,462 A | 9/1992 | Spitsyn et al. |
| 5,173,928 A | 12/1992 | Momose et al. |
| 5,204,887 A | 4/1993 | Hayashida et al. |
| 5,220,591 A | 6/1993 | Ohsugi et al. |
| 5,249,216 A | 9/1993 | Ohsugi et al. |
| 5,280,176 A | 1/1994 | Jach et al. |
| 5,371,774 A | 12/1994 | Cerrina |
| 5,416,820 A | 5/1995 | Weil et al. |
| 5,602,899 A | 2/1997 | Larson |
| 5,629,969 A | 5/1997 | Koshishiba |
| 5,657,365 A | 8/1997 | Yamamoto et al. |
| 5,684,857 A | 11/1997 | De Bokx |
| 5,729,583 A | 3/1998 | Tang et al. |
| 5,737,387 A | 4/1998 | Smither |
| 5,778,039 A | 7/1998 | Hossain |
| 5,790,628 A | 8/1998 | Ishida |
| 5,812,629 A | 9/1998 | Clauser |
| 5,825,848 A | 10/1998 | Virshup et al. |
| 5,832,052 A | 11/1998 | Hirose et al. |
| 5,857,008 A | 1/1999 | Reinhold |
| 5,878,110 A | 3/1999 | Yamamoto et al. |
| 5,912,940 A | 6/1999 | O'Hara |
| 5,978,448 A | 11/1999 | Bristol |
| 6,108,398 A | 8/2000 | Mazor et al. |
| 6,118,853 A | 9/2000 | Hansen et al. |
| 6,125,167 A | 9/2000 | Morgan |
| 6,181,773 B1 | 1/2001 | Lee et al. |
| 6,185,277 B1 | 2/2001 | Harding |
| 6,195,410 B1 | 2/2001 | Cash, Jr. |
| 6,226,347 B1 | 5/2001 | Golenhofen |
| 6,307,916 B1 | 10/2001 | Rogers et al. |
| 6,377,660 B1 | 4/2002 | Ukita et al. |
| 6,381,303 B1 | 4/2002 | Vu et al. |
| 6,430,254 B2 | 8/2002 | Wilkins |
| 6,430,260 B1 | 8/2002 | Snyder |
| 6,442,231 B1 | 8/2002 | O'Hara |
| 6,456,688 B1 | 9/2002 | Taguchi et al. |
| 6,463,123 B1 | 10/2002 | Korenev |
| 6,487,272 B1 | 11/2002 | Kutsuzawa |
| 6,504,902 B2 | 1/2003 | Iwasaki et al. |
| 6,512,814 B2 | 1/2003 | Yokhin et al. |
| 6,553,096 B1 | 4/2003 | Zhou et al. |
| 6,560,313 B1 | 5/2003 | Harding et al. |
| 6,560,315 B1 | 5/2003 | Price et al. |
| 6,577,704 B1 | 6/2003 | Holz |
| 6,611,577 B1 | 8/2003 | Yamagami |
| 6,639,968 B2 | 10/2003 | Yokhin et al. |
| 6,707,883 B1 | 3/2004 | Tiearney et al. |
| 6,711,234 B1 * | 3/2004 | Loxley ............... G01N 23/223 378/85 |
| 6,763,086 B2 | 7/2004 | Platonov |
| 6,829,327 B1 | 12/2004 | Chen |
| 6,850,598 B1 | 2/2005 | Fryda et al. |
| 6,895,071 B2 | 5/2005 | Yokhin et al. |
| 6,914,723 B2 | 7/2005 | Yun et al. |
| 6,917,472 B1 | 7/2005 | Yun et al. |
| 6,934,359 B2 | 8/2005 | Chen |
| 6,947,522 B2 | 9/2005 | Wilson et al. |
| 6,975,703 B2 | 12/2005 | Wilson et al. |
| 7,003,077 B2 | 2/2006 | Jen et al. |
| 7,006,596 B1 | 2/2006 | Janik |
| 7,023,950 B1 | 4/2006 | Annis |
| 7,023,955 B2 | 4/2006 | Chen et al. |
| 7,075,073 B1 | 7/2006 | Janik et al. |
| 7,079,625 B2 | 7/2006 | Lenz |
| 7,095,822 B1 | 8/2006 | Yun |
| 7,119,953 B2 | 10/2006 | Yun et al. |
| 7,120,228 B2 | 10/2006 | Yokhin et al. |
| 7,180,979 B2 | 2/2007 | Momose |
| 7,180,981 B2 | 2/2007 | Wang |
| 7,183,547 B2 | 2/2007 | Yun et al. |
| 7,187,751 B2 | 3/2007 | Kawahara et al. |
| 7,215,736 B1 | 5/2007 | Wang et al. |
| 7,215,741 B2 | 5/2007 | Ukita et al. |
| 7,218,700 B2 | 5/2007 | Huber et al. |
| 7,218,703 B2 | 5/2007 | Yada et al. |
| 7,221,731 B2 | 5/2007 | Yada et al. |
| 7,245,696 B2 | 7/2007 | Yun et al. |
| 7,258,485 B2 | 8/2007 | Nakano et al. |
| 7,268,945 B2 | 9/2007 | Yun et al. |
| 7,330,533 B2 | 2/2008 | Sampayon |
| 7,346,148 B2 | 3/2008 | Ukita |
| 7,349,525 B2 | 3/2008 | Morton |
| 7,359,487 B1 | 4/2008 | Newcome |
| 7,382,864 B2 | 6/2008 | Hebert et al. |
| 7,388,942 B2 | 6/2008 | Wang et al. |
| 7,394,890 B1 | 7/2008 | Wang et al. |
| 7,400,704 B1 | 7/2008 | Yun et al. |
| 7,406,151 B1 | 7/2008 | Yun |
| 7,414,787 B2 | 8/2008 | Yun et al. |
| 7,443,953 B1 | 10/2008 | Yun et al. |
| 7,443,958 B2 | 10/2008 | Harding |
| 7,453,560 B2 | 11/2008 | Miyake |
| 7,463,712 B2 | 12/2008 | Zhu et al. |
| 7,486,770 B2 | 2/2009 | Baumann |
| 7,492,871 B2 | 2/2009 | Popescu |
| 7,499,521 B2 | 3/2009 | Wang et al. |
| 7,515,684 B2 | 4/2009 | Gibson et al. |
| 7,519,153 B1 | 4/2009 | Moore |
| 7,522,698 B2 | 4/2009 | Popescu |
| 7,522,707 B2 | 4/2009 | Steinlage et al. |
| 7,522,708 B2 | 4/2009 | Heismann |
| 7,529,343 B2 | 5/2009 | Safai et al. |
| 7,532,704 B2 | 5/2009 | Hempel |
| 7,551,719 B2 | 6/2009 | Yokhin et al. |
| 7,551,722 B2 | 6/2009 | Ohshima et al. |
| 7,561,662 B2 | 7/2009 | Wang et al. |
| 7,564,941 B2 | 7/2009 | Baumann |
| 7,601,399 B2 | 10/2009 | Barnola et al. |
| 7,639,786 B2 | 12/2009 | Baumann |
| 7,646,843 B2 | 1/2010 | Popescu et al. |
| 7,653,174 B2 * | 1/2010 | Mazor ............... G01N 23/223 378/50 |
| 7,653,177 B2 | 1/2010 | Baumann et al. |
| 7,672,433 B2 | 3/2010 | Zhong et al. |
| 7,680,243 B2 | 3/2010 | Yokhin et al. |
| 7,787,588 B1 | 8/2010 | Yun et al. |
| 7,796,725 B1 | 9/2010 | Yun et al. |
| 7,796,726 B1 | 9/2010 | Gendreau et al. |
| 7,809,113 B2 | 10/2010 | Aoki et al. |
| 7,813,475 B1 | 10/2010 | Wu et al. |
| 7,817,777 B2 | 10/2010 | Baumann et al. |
| 7,848,483 B2 | 12/2010 | Platonov |
| 7,864,922 B2 | 1/2011 | Kawabe |
| 7,873,146 B2 | 1/2011 | Okunuki et al. |
| 7,876,883 B2 | 1/2011 | O'Hara |

(56) References Cited

U.S. PATENT DOCUMENTS

| | | |
|---|---|---|
| 7,889,838 B2 | 2/2011 | David et al. |
| 7,889,844 B2 | 2/2011 | Okunuki et al. |
| 7,899,154 B2 | 3/2011 | Chen et al. |
| 7,920,676 B2 | 4/2011 | Yun et al. |
| 7,924,973 B2 | 4/2011 | Kottler et al. |
| 7,929,667 B1 | 4/2011 | Zhuang et al. |
| 7,945,018 B2 | 5/2011 | Heismann |
| 7,949,092 B2 | 5/2011 | Brons |
| 7,949,095 B2 | 5/2011 | Ning |
| 7,974,379 B1 | 7/2011 | Case et al. |
| 7,983,381 B2 | 7/2011 | David et al. |
| 7,991,120 B2 | 8/2011 | Okunuki et al. |
| 8,005,185 B2 | 8/2011 | Popescu |
| 8,009,796 B2 | 8/2011 | Popescu |
| 8,009,797 B2 | 8/2011 | Ouchi |
| 8,041,004 B2 | 10/2011 | David |
| 8,036,341 B2 | 11/2011 | Lee |
| 8,058,621 B2 | 11/2011 | Kommareddy |
| 8,068,579 B1 | 11/2011 | Yun et al. |
| 8,073,099 B2 | 12/2011 | Niu et al. |
| 8,094,784 B2 | 1/2012 | Morton |
| 8,139,711 B2 | 3/2012 | Takahashi |
| 8,139,716 B2 | 3/2012 | Okunuki et al. |
| 8,165,270 B2 | 4/2012 | David et al. |
| 8,184,771 B2 | 5/2012 | Murakoshi |
| 8,208,603 B2 | 6/2012 | Sato |
| 8,233,587 B2 | 7/2012 | Sato |
| 8,243,879 B2 | 8/2012 | Itoh et al. |
| 8,243,884 B2 | 8/2012 | Rödhammer et al. |
| 8,306,183 B2 | 11/2012 | Koehler |
| 8,306,184 B2 | 11/2012 | Chang et al. |
| 8,331,534 B2 | 12/2012 | Silver |
| 8,351,570 B2 | 1/2013 | Nakamura |
| 8,353,628 B1 | 1/2013 | Yun et al. |
| 8,360,640 B2 | 1/2013 | Reinhold |
| 8,374,309 B2 | 2/2013 | Donath |
| 8,406,378 B2 | 3/2013 | Wang et al. |
| 8,416,920 B2 | 4/2013 | Okumura et al. |
| 8,451,975 B2 | 5/2013 | Tada |
| 8,422,637 B2 | 6/2013 | Okunuki et al. |
| 8,509,386 B2 | 8/2013 | Lee et al. |
| 8,513,603 B1 | 8/2013 | Lederman et al. |
| 8,520,803 B2 | 8/2013 | Behling |
| 8,553,843 B2 | 10/2013 | Drory |
| 8,559,594 B2 | 10/2013 | Ouchi |
| 8,559,597 B2 | 10/2013 | Chen et al. |
| 8,565,371 B2 | 10/2013 | Bredno |
| 8,588,372 B2 | 11/2013 | Zou et al. |
| 8,591,108 B2 | 11/2013 | Tada |
| 8,602,648 B1 | 12/2013 | Jacobsen et al. |
| 8,632,247 B2 | 1/2014 | Ishii |
| 8,644,451 B2 | 2/2014 | Aoki et al. |
| 8,666,024 B2 | 3/2014 | Okunuki et al. |
| 8,699,667 B2 | 4/2014 | Steinlage et al. |
| 8,755,487 B2 | 6/2014 | Kaneko |
| 8,767,915 B2 | 7/2014 | Stutman |
| 8,767,916 B2 | 7/2014 | Hashimoto |
| 8,781,069 B2 | 7/2014 | Murakoshi |
| 8,824,629 B2 | 9/2014 | Ishii |
| 8,831,179 B2 | 9/2014 | Adler et al. |
| 8,837,680 B2 | 9/2014 | Tsujii |
| 8,855,265 B2 | 10/2014 | Engel |
| 8,859,977 B2 | 10/2014 | Kondoh |
| 8,861,682 B2 | 10/2014 | Okunuki et al. |
| 8,908,824 B2 | 12/2014 | Kondoh |
| 8,972,191 B2 | 3/2015 | Stampanoni et al. |
| 8,989,351 B2 | 3/2015 | Vogtmeier et al. |
| 8,989,474 B2 | 3/2015 | Kido et al. |
| 8,995,622 B2 | 3/2015 | Adler et al. |
| 9,001,967 B2 | 4/2015 | Baturin |
| 9,008,278 B2 | 4/2015 | Lee et al. |
| 9,016,943 B2 | 4/2015 | Jacobsen et al. |
| 9,020,101 B2 | 4/2015 | Omote et al. |
| 9,025,725 B2 | 5/2015 | Kiyohara et al. |
| 9,029,795 B2 | 5/2015 | Sando |
| 9,031,201 B2 | 5/2015 | Sato |
| 9,036,773 B2 | 5/2015 | David et al. |
| 9,063,055 B2 | 6/2015 | Ouchi |
| 9,086,536 B2 | 7/2015 | Pang et al. |
| 9,129,715 B2 | 9/2015 | Adler et al. |
| 9,222,899 B2 | 12/2015 | Yamaguchi |
| 9,230,703 B2 | 1/2016 | Mohr et al. |
| 9,234,856 B2 | 1/2016 | Mukaide |
| 9,251,995 B2 | 2/2016 | Ogura |
| 9,257,254 B2 | 2/2016 | Ogura et al. |
| 9,263,225 B2 | 2/2016 | Morton |
| 9,281,158 B2 | 3/2016 | Ogura |
| 9,291,578 B2 | 3/2016 | Adler |
| 9,329,141 B2 | 5/2016 | Stutman |
| 9,357,975 B2 | 6/2016 | Baturin |
| 9,362,081 B2 | 6/2016 | Bleuet |
| 9,390,881 B2 | 7/2016 | Yun et al. |
| 9,412,552 B2 | 8/2016 | Aoki et al. |
| 9,439,613 B2 | 9/2016 | Stutman |
| 9,448,190 B2 | 9/2016 | Yun et al. |
| 9,449,780 B2 | 9/2016 | Chen |
| 9,449,781 B2 | 9/2016 | Yun et al. |
| 9,453,803 B2 | 9/2016 | Radicke |
| 9,480,447 B2 | 11/2016 | Mohr et al. |
| 9,486,175 B2 | 11/2016 | Fredenberg et al. |
| 9,494,534 B2 | 11/2016 | Baturin |
| 9,502,204 B2 | 11/2016 | Ikarashi |
| 9,520,260 B2 | 12/2016 | Hesselink et al. |
| 9,524,846 B2 | 12/2016 | Sato et al. |
| 9,532,760 B2 | 1/2017 | Anton et al. |
| 9,541,511 B2 | 1/2017 | Vigliante |
| 9,543,109 B2 | 1/2017 | Yun et al. |
| 9,551,677 B2 | 1/2017 | Mazor et al. |
| 9,557,280 B2 | 1/2017 | Pfeiffer et al. |
| 9,564,284 B2 | 2/2017 | Gerzoskovitz |
| 9,570,264 B2 | 2/2017 | Ogura et al. |
| 9,570,265 B1 | 2/2017 | Yun et al. |
| 9,588,066 B2 | 3/2017 | Pois et al. |
| 9,594,036 B2 | 3/2017 | Yun et al. |
| 9,595,415 B2 | 3/2017 | Ogura |
| 9,632,040 B2 | 4/2017 | Stutman |
| 9,700,267 B2 | 7/2017 | Baturin et al. |
| 9,715,989 B2 | 7/2017 | Dalakos et al. |
| 9,719,947 B2 | 8/2017 | Yun et al. |
| 9,748,012 B2 | 8/2017 | Yokoyama |
| 9,757,081 B2 | 9/2017 | Proksa |
| 9,761,021 B2 | 9/2017 | Koehler |
| 9,770,215 B2 | 9/2017 | Souchay et al. |
| 9,778,213 B2 | 10/2017 | Bakeman et al. |
| 9,823,203 B2 | 11/2017 | Yun et al. |
| 9,826,949 B2 | 11/2017 | Ning |
| 9,861,330 B2 | 1/2018 | Rossl |
| 9,874,531 B2 | 1/2018 | Yun et al. |
| 9,881,710 B2 | 1/2018 | Roessl |
| 9,916,655 B2 | 3/2018 | Sampanoni |
| 9,934,930 B2 | 4/2018 | Parker et al. |
| 10,014,148 B2 | 7/2018 | Tang et al. |
| 10,020,158 B2 | 7/2018 | Yamada |
| 10,028,716 B2 | 7/2018 | Rossl |
| 10,045,753 B2 | 8/2018 | Teshima |
| 10,068,740 B2 | 9/2018 | Gupta |
| 10,074,451 B2 | 9/2018 | Kottler et al. |
| 10,076,297 B2 | 9/2018 | Bauer |
| 10,085,701 B2 | 10/2018 | Hoshino |
| 10,105,112 B2 | 10/2018 | Utsumi |
| 10,115,557 B2 | 10/2018 | Ishii |
| 10,141,081 B2 | 11/2018 | Preusche |
| 10,151,713 B2 | 12/2018 | Wu et al. |
| 10,153,061 B2 | 12/2018 | Yokoyama |
| 10,153,062 B2 | 12/2018 | Gall et al. |
| 10,217,596 B2 | 2/2019 | Liang et al. |
| 10,247,683 B2 | 4/2019 | Yun et al. |
| 10,264,659 B1 | 4/2019 | Miller et al. |
| 10,267,752 B2 | 4/2019 | Zhang et al. |
| 10,267,753 B2 | 4/2019 | Zhang et al. |
| 10,269,528 B2 | 4/2019 | Yun et al. |
| 10,295,485 B2 | 5/2019 | Yun et al. |
| 10,297,359 B2 | 5/2019 | Yun et al. |
| 10,304,580 B2 | 5/2019 | Yun et al. |

(56) References Cited

U.S. PATENT DOCUMENTS

| | | |
|---|---|---|
| 10,349,908 B2 | 7/2019 | Yun et al. |
| 10,352,695 B2 | 7/2019 | Dziura et al. |
| 10,352,880 B2 | 7/2019 | Yun et al. |
| 10,366,860 B2 | 7/2019 | Parker et al. |
| 10,401,309 B2 | 9/2019 | Yun et al. |
| 10,416,099 B2 | 9/2019 | Yun et al. |
| 10,466,185 B2 | 11/2019 | Yun et al. |
| 10,473,598 B2 | 11/2019 | Ogata et al. |
| 10,485,492 B2 | 11/2019 | Koehler et al. |
| 10,514,345 B2 | 12/2019 | Ogata et al. |
| 10,514,346 B2 | 12/2019 | Sako |
| 10,568,588 B2 | 2/2020 | Koehler et al. |
| 10,578,566 B2 | 3/2020 | Yun et al. |
| 10,634,628 B2 | 4/2020 | Kasper et al. |
| 10,653,376 B2 | 5/2020 | Yun et al. |
| 10,697,902 B2 | 6/2020 | Sharma et al. |
| 10,743,396 B1 | 8/2020 | Kawase |
| 10,782,252 B2 | 9/2020 | Gateshki et al. |
| 10,794,845 B2 | 10/2020 | Filsinger |
| 10,841,515 B1 | 11/2020 | Tsujino |
| 10,847,336 B2 | 11/2020 | Durst et al. |
| 10,895,541 B2 | 1/2021 | Shchegrov et al. |
| 10,962,491 B2 | 3/2021 | Yun et al. |
| 10,976,270 B2 | 4/2021 | Wormington |
| 11,054,375 B2 | 6/2021 | Seidler et al. |
| 11,175,243 B1 | 11/2021 | Yun et al. |
| 11,215,572 B2 | 1/2022 | Yun et al. |
| 11,549,895 B2 | 1/2023 | Yun et al. |
| 11,733,185 B2 * | 8/2023 | Ogata ............... G01N 23/223 378/45 |
| 11,796,490 B2 * | 10/2023 | Seidler ............ G01N 23/2076 |
| 11,885,755 B2 * | 1/2024 | Yun .................. G01N 23/2209 |
| 12,209,977 B2 * | 1/2025 | Yun ................ G01N 23/20008 |
| 2001/0046276 A1 | 11/2001 | Schneider et al. |
| 2002/0085676 A1 | 7/2002 | Snyder |
| 2002/0150208 A1 | 10/2002 | Yohkin et al. |
| 2003/0142790 A1 | 1/2003 | Zhou et al. |
| 2003/0072413 A1 | 4/2003 | Yokhin et al. |
| 2003/0142781 A1 | 7/2003 | Kawahara |
| 2003/0223536 A1 | 12/2003 | Yun et al. |
| 2004/0028186 A1 | 2/2004 | Yokhin et al. |
| 2004/0047446 A1 | 3/2004 | Platonov |
| 2004/0076260 A1 | 4/2004 | Charles Jr. |
| 2004/0120463 A1 | 6/2004 | Wilson et al. |
| 2004/0140432 A1 | 7/2004 | Maldonado et al. |
| 2005/0074094 A1 | 4/2005 | Jen et al. |
| 2005/0087699 A1 | 4/2005 | Miyake |
| 2005/0123097 A1 | 6/2005 | Wang |
| 2005/0201520 A1 | 9/2005 | Smith et al. |
| 2005/0282300 A1 | 12/2005 | Yun et al. |
| 2005/0286680 A1 | 12/2005 | Momose |
| 2006/0062350 A1 | 3/2006 | Yokhin |
| 2006/0088139 A1 | 4/2006 | Nankano et al. |
| 2006/0182322 A1 | 8/2006 | Bernhardt et al. |
| 2006/0233309 A1 | 10/2006 | Kutzner et al. |
| 2007/0071174 A1 | 3/2007 | Hebert et al. |
| 2007/0108387 A1 | 5/2007 | Yun et al. |
| 2007/0110217 A1 | 5/2007 | Ukita |
| 2007/0183563 A1 | 8/2007 | Baumann |
| 2007/0183579 A1 | 8/2007 | Baumann et al. |
| 2007/0189449 A1 | 8/2007 | Baumann |
| 2007/0248215 A1 | 10/2007 | Ohshima et al. |
| 2007/0285643 A1 | 12/2007 | Wedowski et al. |
| 2008/0043908 A1 | 2/2008 | Teramoto et al. |
| 2008/0084966 A1 | 4/2008 | Aoki et al. |
| 2008/0089484 A1 | 4/2008 | Reinhold |
| 2008/0137812 A1 | 6/2008 | Frontera et al. |
| 2008/0159475 A1 * | 7/2008 | Mazor ............... G01N 23/223 378/50 |
| 2008/0170662 A1 | 7/2008 | Reinhold |
| 2008/0170668 A1 | 7/2008 | Kruit et al. |
| 2008/0181363 A1 | 7/2008 | Fenter et al. |
| 2008/0273662 A1 | 11/2008 | Yun |
| 2009/0052619 A1 | 2/2009 | Endoh |
| 2009/0092227 A1 | 4/2009 | David |
| 2009/0154640 A1 | 6/2009 | Baumann et al. |
| 2009/0316857 A1 | 12/2009 | David et al. |
| 2009/0316860 A1 | 12/2009 | Okunuki et al. |
| 2010/0027739 A1 | 2/2010 | Lantz et al. |
| 2010/0040202 A1 | 2/2010 | Lee |
| 2010/0061508 A1 | 3/2010 | Takahashi |
| 2010/0091947 A1 | 4/2010 | Niu |
| 2010/0141151 A1 | 6/2010 | Reinhold |
| 2010/0201240 A1 | 8/2010 | Heinke et al. |
| 2010/0246765 A1 | 9/2010 | Murakoshi |
| 2010/0260315 A1 | 10/2010 | Sato et al. |
| 2010/0284513 A1 | 11/2010 | Kawabe |
| 2010/0310041 A1 | 12/2010 | Adams et al. |
| 2010/0329532 A1 | 12/2010 | Masuda et al. |
| 2011/0026680 A1 | 2/2011 | Sato |
| 2011/0038455 A1 | 2/2011 | Silver et al. |
| 2011/0058655 A1 | 3/2011 | Okumura et al. |
| 2011/0064202 A1 | 3/2011 | Thran et al. |
| 2011/0085641 A1 | 4/2011 | Okunuki et al. |
| 2011/0135066 A1 | 6/2011 | Behling |
| 2011/0142204 A1 | 6/2011 | Zou et al. |
| 2011/0235781 A1 | 9/2011 | Aoki et al. |
| 2011/0243302 A1 | 10/2011 | Murakoshi |
| 2011/0268252 A1 | 11/2011 | Ozawa et al. |
| 2012/0041679 A1 | 2/2012 | Stampanoni |
| 2012/0057669 A1 | 3/2012 | Vogtmeier et al. |
| 2012/0163547 A1 | 6/2012 | Lee et al. |
| 2012/0224670 A1 | 9/2012 | Kiyohara et al. |
| 2012/0228475 A1 | 9/2012 | Pang et al. |
| 2012/0269323 A1 | 10/2012 | Adler et al. |
| 2012/0269324 A1 | 10/2012 | Adler |
| 2012/0269325 A1 | 10/2012 | Adler et al. |
| 2012/0269326 A1 | 10/2012 | Adler et al. |
| 2013/0011040 A1 | 1/2013 | Kido et al. |
| 2013/0039460 A1 | 2/2013 | Levy |
| 2013/0108012 A1 | 5/2013 | Sato |
| 2013/0108022 A1 | 5/2013 | Kugland et al. |
| 2013/0195246 A1 | 8/2013 | Tamura et al. |
| 2013/0202084 A1 | 8/2013 | Piorek et al. |
| 2013/0223594 A1 | 8/2013 | Sprong et al. |
| 2013/0235976 A1 | 9/2013 | Jeong et al. |
| 2013/0251100 A1 | 9/2013 | Sasaki et al. |
| 2013/0259207 A1 | 10/2013 | Omote et al. |
| 2013/0308112 A1 | 11/2013 | Clube et al. |
| 2013/0308754 A1 | 11/2013 | Yamazaki et al. |
| 2014/0023973 A1 | 1/2014 | Marconi et al. |
| 2014/0029729 A1 | 1/2014 | Kucharczyk |
| 2014/0037052 A1 | 2/2014 | Adler |
| 2014/0064445 A1 | 3/2014 | Adler |
| 2014/0072102 A1 | 3/2014 | Bluet |
| 2014/0072104 A1 | 3/2014 | Jacobsen et al. |
| 2014/0079188 A1 | 3/2014 | Hesselink et al. |
| 2014/0105353 A1 | 4/2014 | Pfeiffer et al. |
| 2014/0105363 A1 | 4/2014 | Chen et al. |
| 2014/0112440 A1 | 4/2014 | David et al. |
| 2014/0146945 A1 | 5/2014 | Fredenberg et al. |
| 2014/0153692 A1 | 6/2014 | Larkin et al. |
| 2014/0177800 A1 | 6/2014 | Sato et al. |
| 2014/0185778 A1 | 7/2014 | Lee et al. |
| 2014/0205057 A1 | 7/2014 | Koehler et al. |
| 2014/0211919 A1 | 7/2014 | Ogura et al. |
| 2014/0226785 A1 | 8/2014 | Stutman et al. |
| 2014/0270060 A1 | 9/2014 | Date et al. |
| 2014/0369469 A1 | 12/2014 | Ogura et al. |
| 2014/0369471 A1 | 12/2014 | Ogura et al. |
| 2015/0023472 A1 | 1/2015 | Schmitt et al. |
| 2015/0030126 A1 | 1/2015 | Radicke |
| 2015/0030127 A1 | 1/2015 | Aoki et al. |
| 2015/0043713 A1 | 2/2015 | Chen |
| 2015/0049860 A1 | 2/2015 | Das |
| 2015/0051877 A1 | 2/2015 | Bakeman et al. |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0092923 A1 | 4/2015 | Iida et al. |
| 2015/0092924 A1 | 4/2015 | Yun et al. |
| 2015/0110252 A1 | 4/2015 | Yun et al. |
| 2015/0117599 A1 | 4/2015 | Yun et al. |
| 2015/0146847 A1 | 5/2015 | Liu |

(56) References Cited

U.S. PATENT DOCUMENTS

| | | |
|---|---|---|
| 2015/0194287 A1 | 7/2015 | Yun et al. |
| 2015/0243397 A1 | 8/2015 | Yun et al. |
| 2015/0247811 A1 | 9/2015 | Yun et al. |
| 2015/0260663 A1 | 9/2015 | Yun et al. |
| 2015/0270023 A1 | 9/2015 | Adler |
| 2015/0323478 A1 | 11/2015 | Stutman |
| 2015/0357069 A1 | 12/2015 | Yun et al. |
| 2016/0064175 A1 | 3/2016 | Yun et al. |
| 2016/0066870 A1 | 3/2016 | Yun et al. |
| 2016/0091701 A1 | 3/2016 | Raghunathan |
| 2016/0106387 A1 | 4/2016 | Kahn |
| 2016/0178540 A1 | 6/2016 | Yun et al. |
| 2016/0178541 A1 | 6/2016 | Hwang et al. |
| 2016/0206259 A1 | 7/2016 | Auclair et al. |
| 2016/0268094 A1 | 9/2016 | Yun et al. |
| 2016/0320320 A1 | 11/2016 | Yun et al. |
| 2016/0336140 A1 | 11/2016 | Nonoguchi et al. |
| 2016/0341674 A1 | 11/2016 | Wu et al. |
| 2016/0343538 A1 | 11/2016 | Kawanishi et al. |
| 2016/0351283 A1 | 12/2016 | Adler et al. |
| 2016/0351370 A1 | 12/2016 | Yun et al. |
| 2017/0018392 A1 | 1/2017 | Cheng |
| 2017/0038481 A1 | 2/2017 | Cheng et al. |
| 2017/0047191 A1 | 2/2017 | Yun et al. |
| 2017/0162288 A1 | 6/2017 | Yun et al. |
| 2017/0162359 A1 | 6/2017 | Tang et al. |
| 2017/0176356 A1 | 6/2017 | Hoffman et al. |
| 2017/0184520 A1 | 6/2017 | Mortensen et al. |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 | 11/2017 | Yun et al. |
| 2018/0144901 A1 | 5/2018 | Yun et al. |
| 2018/0182131 A1 | 6/2018 | Koehler et al. |
| 2018/0202951 A1 | 7/2018 | Yun et al. |
| 2018/0261352 A1 | 9/2018 | Matsuyama et al. |
| 2018/0301312 A1 | 10/2018 | Haig |
| 2018/0306734 A1 | 10/2018 | Morimoto et al. |
| 2018/0323032 A1 | 11/2018 | Strelec et al. |
| 2018/0348151 A1 | 12/2018 | Kasper et al. |
| 2019/0011379 A1 | 1/2019 | Yun et al. |
| 2019/0017942 A1 | 1/2019 | Filevich |
| 2019/0017946 A1 | 1/2019 | Wack et al. |
| 2019/0019647 A1 | 1/2019 | Lee et al. |
| 2019/0027265 A1 | 1/2019 | Dey et al. |
| 2019/0057832 A1 | 2/2019 | Durst et al. |
| 2019/0064084 A1 | 2/2019 | Ullom et al. |
| 2019/0086342 A1 | 3/2019 | Pois et al. |
| 2019/0088439 A1 | 3/2019 | Honda |
| 2019/0115184 A1 | 4/2019 | Zalubovsky |
| 2019/0131103 A1 | 5/2019 | Tuohimaa |
| 2019/0132936 A1 | 5/2019 | Steck et al. |
| 2019/0145917 A1 | 5/2019 | Yun et al. |
| 2019/0148102 A1 | 5/2019 | Maltz |
| 2019/0172681 A1 | 6/2019 | Owen et al. |
| 2019/0189385 A1 | 6/2019 | Liang et al. |
| 2019/0204757 A1 | 7/2019 | Brussard et al. |
| 2019/0206652 A1 | 7/2019 | Akinwande et al. |
| 2019/0212281 A1 | 7/2019 | Shchgegrov |
| 2019/0214216 A1 | 7/2019 | Jeong et al. |
| 2019/0216416 A1 | 7/2019 | Koehler et al. |
| 2019/0219713 A1 | 7/2019 | Booker et al. |
| 2019/0257774 A1 | 8/2019 | Seidler et al. |
| 2019/0261935 A1 | 8/2019 | Kitamura |
| 2019/0302042 A1 | 10/2019 | Yun et al. |
| 2019/0304735 A1 | 10/2019 | Safai et al. |
| 2019/0311874 A1 | 10/2019 | Tuohimma et al. |
| 2019/0317027 A1 | 10/2019 | Tsuboi et al. |
| 2019/0331616 A1 | 10/2019 | Schaff et al. |
| 2019/0341219 A1 | 11/2019 | Zhang et al. |
| 2019/0341220 A1 | 11/2019 | Parker et al. |
| 2019/0369271 A1 | 12/2019 | Yun et al. |
| 2019/0369272 A1 | 12/2019 | Yun et al. |
| 2019/0380193 A1 | 12/2019 | Matsuhana et al. |
| 2019/0387602 A1 | 12/2019 | Woywode et al. |
| 2019/0391087 A1 | 12/2019 | Matejka et al. |
| 2020/0003712 A1 | 1/2020 | Kataoka et al. |
| 2020/0041429 A1 | 2/2020 | Cho et al. |
| 2020/0058462 A1 | 2/2020 | Suzuki |
| 2020/0072770 A1 | 3/2020 | Yun et al. |
| 2020/0088656 A1 | 3/2020 | Pois et al. |
| 2020/0090826 A1 | 3/2020 | Adler |
| 2020/0098537 A1 | 3/2020 | Yun et al. |
| 2020/0103358 A1 | 4/2020 | Wiell et al. |
| 2020/0105492 A1 | 4/2020 | Behling et al. |
| 2020/0154552 A1 | 5/2020 | Suzuki et al. |
| 2020/0155088 A1 | 5/2020 | Gruener et al. |
| 2020/0158662 A1 | 5/2020 | Horiba et al. |
| 2020/0163195 A1 | 5/2020 | Steck et al. |
| 2020/0168427 A1 | 5/2020 | Krokhmal et al. |
| 2020/0182806 A1 | 6/2020 | Kappler et al. |
| 2020/0187339 A1 | 6/2020 | Freudenberger et al. |
| 2020/0194212 A1 | 6/2020 | Dalakos et al. |
| 2020/0203113 A1 | 6/2020 | Ponard |
| 2020/0225172 A1 | 7/2020 | Sato et al. |
| 2020/0225173 A1 | 7/2020 | Sato et al. |
| 2020/0225371 A1 | 7/2020 | Greenberg et al. |
| 2020/0232937 A1 | 7/2020 | Yaroshenko et al. |
| 2020/0234908 A1 | 7/2020 | Fishman et al. |
| 2020/0279351 A1 | 9/2020 | Ratner et al. |
| 2020/0292475 A1 | 9/2020 | Cao et al. |
| 2020/0300789 A1 | 9/2020 | Osakabe et al. |
| 2020/0300790 A1 | 9/2020 | Gellineau et al. |
| 2020/0303265 A1 | 9/2020 | Gellineau et al. |
| 2020/0305809 A1 | 10/2020 | Schwoebel et al. |
| 2020/0319120 A1 | 10/2020 | Kitamura et al. |
| 2020/0321184 A1 | 10/2020 | Parker et al. |
| 2020/0337659 A1 | 10/2020 | Sano et al. |
| 2020/0365361 A1 | 11/2020 | Yun et al. |
| 2020/0378905 A1 | 12/2020 | Safai |
| 2020/0378908 A1 | 12/2020 | Fujimura et al. |
| 2020/0388461 A1 | 12/2020 | Behling et al. |
| 2021/0020398 A1 | 1/2021 | Yun et al. |
| 2021/0055237 A1 | 2/2021 | Shchegrov et al. |
| 2021/0080408 A1 | 3/2021 | Yun et al. |
| 2021/0116399 A1* | 4/2021 | Ogata ............... G01N 23/2076 |
| 2021/0255123 A1 | 8/2021 | Koskinen et al. |
| 2021/0356412 A1 | 11/2021 | Yun et al. |
| 2022/0003694 A1 | 1/2022 | Seidler et al. |
| 2022/0082515 A1 | 3/2022 | Yun et al. |
| 2022/0178851 A1 | 6/2022 | Yun et al. |
| 2022/0404297 A1* | 12/2022 | Nii .................... G01N 23/2204 |
| 2023/0280291 A1* | 9/2023 | Yun .................... G01N 23/2204 378/44 |
| 2023/0349842 A1 | 11/2023 | Yun et al. |
| 2024/0280515 A1 | 8/2024 | Yun et al. |

FOREIGN PATENT DOCUMENTS

| | | |
|---|---|---|
| CN | 101257851 B | 9/2008 |
| CN | 101532969 B | 9/2009 |
| CN | 101566591 A | 10/2009 |
| CN | 101576515 A | 11/2009 |
| CN | 101413905 A | 3/2011 |
| CN | 102124537 A | 7/2011 |
| CN | 102325498 B | 1/2012 |
| CN | 102507623 A | 6/2012 |
| CN | 102551761 A | 7/2012 |
| CN | 103604818 A | 2/2014 |
| CN | 104264228 A | 1/2015 |
| CN | 104068875 A | 5/2017 |
| CN | 206531787 U | 9/2017 |
| EP | 0432568 | 6/1991 |
| EP | 0751533 | 1/1997 |
| EP | 1028451 | 8/2000 |
| EP | 1169713 | 1/2006 |
| EP | 2592626 | 5/2013 |
| EP | 3093867 A1 | 11/2016 |
| EP | 3168856 A2 | 5/2017 |
| FR | 2548447 | 1/1985 |
| JP | H01-097844 A | 4/1989 |
| JP | H04-285847 A | 10/1992 |
| JP | H06-188092 | 7/1994 |
| JP | H06-213833 A | 8/1994 |

(56) References Cited

FOREIGN PATENT DOCUMENTS

| | | |
|---|---|---|
| JP | H07-056000 | 3/1995 |
| JP | H07-194592 | 8/1995 |
| JP | H07-311165 A | 11/1995 |
| JP | H08-128971 | 5/1996 |
| JP | H08-184572 | 7/1996 |
| JP | H09-166488 | 6/1997 |
| JP | 2843529 B2 * | 1/1999 |
| JP | H11-304728 | 11/1999 |
| JP | H11-352079 | 12/1999 |
| JP | 2000-306533 | 11/2000 |
| JP | 2001-021507 | 1/2001 |
| JP | 2001-124711 | 5/2001 |
| JP | 2001-235437 | 8/2001 |
| JP | 2002-214165 | 7/2002 |
| JP | 2003-149392 | 5/2003 |
| JP | 2003-288853 | 10/2003 |
| JP | 2004-089445 | 3/2004 |
| JP | 2004-518262 | 6/2004 |
| JP | 2004-333131 | 11/2004 |
| JP | 2006-501444 | 1/2006 |
| JP | 2006-164819 | 6/2006 |
| JP | 2007-218683 | 8/2007 |
| JP | 2007-265981 | 10/2007 |
| JP | 2007-311185 | 11/2007 |
| JP | 2008039772 A * | 2/2008 |
| JP | 2008-200359 | 4/2008 |
| JP | 2008-145111 | 6/2008 |
| JP | 2008-197495 | 8/2008 |
| JP | 2009-195349 | 3/2009 |
| JP | 2009-212058 | 9/2009 |
| JP | 2010-032341 A | 2/2010 |
| JP | 2010-236986 | 10/2010 |
| JP | 2011-029072 | 2/2011 |
| JP | 2011-033537 | 2/2011 |
| JP | 2011-095224 | 5/2011 |
| JP | 2011107005 A * | 6/2011 |
| JP | 2011-218147 | 11/2011 |
| JP | 2012-032387 | 2/2012 |
| JP | 2012-187341 | 10/2012 |
| JP | H06-102399 A | 10/2012 |
| JP | 2012-254294 | 12/2012 |
| JP | 2013-508683 | 3/2013 |
| JP | 2013-096750 | 5/2013 |
| JP | 2013-113782 | 6/2013 |
| JP | 2013-529984 | 7/2013 |
| JP | 2013-157269 | 8/2013 |
| JP | 2013-160637 | 8/2013 |
| JP | 2013-181811 | 9/2013 |
| JP | 2013-239317 | 11/2013 |
| JP | 2014-178130 | 9/2014 |
| JP | 2015-002074 | 1/2015 |
| JP | 2015-047306 | 3/2015 |
| JP | 2015-072263 | 4/2015 |
| JP | 2015-077289 | 4/2015 |
| JP | 2016-537797 | 12/2016 |
| JP | 2017-040618 | 2/2017 |
| JP | 6191051 B2 * | 9/2017 |
| KR | 10-2004-0072780 | 8/2004 |
| KR | 10-2006-0088272 A | 8/2006 |
| KR | 10-2012-0012391 | 2/2012 |
| KR | 10-2012-0091591 A | 8/2012 |
| KR | 10-2014-0059688 | 5/2014 |
| WO | WO 1995/006952 | 3/1995 |
| WO | WO 1998/011592 | 3/1998 |
| WO | WO 1998/041992 | 9/1998 |
| WO | WO 2002/039792 | 5/2002 |
| WO | WO 2003/081631 | 10/2003 |
| WO | WO 2005/109969 | 11/2005 |
| WO | WO 2006/010091 | 1/2006 |
| WO | WO 2006/096052 | 9/2006 |
| WO | WO 2007/125833 | 11/2007 |
| WO | WO 2007/135811 | 11/2007 |
| WO | WO 2008/068044 | 6/2008 |
| WO | WO 2009/098027 | 8/2009 |
| WO | WO 2009/104560 | 8/2009 |
| WO | WO 2010/109909 | 9/2010 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/118593 | 8/2013 |
| WO | WO 2013/160153 | 10/2013 |
| WO | WO 2013/168468 | 11/2013 |
| WO | WO 2014/054497 | 4/2014 |
| WO | WO 2015/016019 | 2/2015 |
| WO | WO 2015/034791 | 3/2015 |
| WO | WO 2015/066333 | 5/2015 |
| WO | WO 2015/084466 | 6/2015 |
| WO | WO 2015/152490 | 10/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/204850 | 11/2017 |
| WO | WO 2017/213996 | 12/2017 |
| WO | WO 2018/122213 | 7/2018 |
| WO | WO 2018/175570 | 9/2018 |

OTHER PUBLICATIONS

Altapova et al., "Phase contrast laminography based on Talbot interferometry," Opt. Express, vol. 20, No. 6, (2012) pp. 6496-6508.
Anklamm et al., "A novel von Hamos spectrometer for efficient X-ray emission spectroscopy in the laboratory," Rev. Sci. Instr. Vol. 85 p. 053110 (2014).
Bachucki et al., "Laboratory-based double X-ray spectrometer for simultaneous X-ray emission and X-ray absorption studies," J. Anal. Atomic Spectr. DOI:10.1039/C9JA00159J (2019).
Baron et al., "A compact optical design for Bragg reflections near backscattering," J. Synchrotron Rad., vol. 8 (2001), pp. 1127-1130.
Bauer et al., "Increasing the sensitivity of micro X-ray fluorescence spectroscopy through an optimized adaptation of polycapillary lenses to a liquid metal jet source," J. Anal. At. Spectrum. DOI:10.1039/d1ja00295c (2021).
Bech, "In-vivo dark-field and phase-contrast x-ray imaging," Scientific Reports 3, (2013), Article No. 03209.
Bech, "X-ray imaging with a grating interferometer," University of Copenhagen PhD. Thesis, (May 1, 2009).
Behling, "Medical X-ray sources Now and for the Future," Nucl. Inst. and Methods in Physics Research A 873, pp. 43-50 (2017).
Bertaux et al., "Sub-pixel high-resolution imaging of high-energy x-rays inspired by sub-wavelength optical imaging," Op. Express, vol. 29, No. 22-25, p. 35003 (2021).
Birkholz, "Chapter 4: Grazing Incidence Configurations," Thin Film Analysis by X-ray Scattering (Wiley-VCH Verlag GmbH & Co. KGaA, Weinheim, Germany, 2006).
Birnbacher et al., "Quantitative X-ray phase contrast computed tomography with grating interferometry," European J. of Nucl. Med. and Mol. Imaging, https://doi.org/10.1007/s00259-021-05259-6 (2021).
Bjeoumikhov et al., "A modular system for XRF and XRD applications consisting of a microfocus X-ray source and different capillary optics," X-ray Spectrometry, vol. 33 (2004), pp. 312-316.
Bogdanowicz et al., "Model-free measurement of lateral recess in gate-all-around transistors with micro hard-X-ray fluorescence," J. Micro/Nanopattern, Mater. Metrol., vol. 22(3), pp. 034001-1-8 (2023).
Brombal et al., "PEPI Lab: a flexible compact multi-modal setup for X-ray phase-contrast and spectral imaging," Sci. Rep. 13, p. 4206, https://doi.org/10.1038/s41598-023-30316-5 (2023).
Buchanan et al., "Effective modelling of high-energy laboratory-based x-ray phase contrast imaging utilising absorption masks or gratings," J. Appl. Physics (accepted) (2020).
Chen et al., "Advance in detection of low sulfur content by wavelength dispersive XRF," Proceedings of the Annual ISA Analysis Division Symposium (2002).

(56) References Cited

OTHER PUBLICATIONS

Chervenak et al., "Experimental thick-target bremsstrahlung spectra from electrons in the range 10 to 30 keV", Phys. Rev. A vol. 12 (1975), pp. 26-33.
Coan et al., "In vivo x-ray phase contrast analyzer-based imaging for longitudinal osteoarthritis studies in guinea pigs," Phys. Med. Biol. vol. 55(24) (2010), pp. 7649-7662.
Cohen et al., "Tunable laboratory extended x-ray absorption fine structure system," Rev. Sci. Instr. vol. 51, No. 3, Mar. 1980, pp. 273-277.
David et al., "Hard X-ray phase imaging and tomography using a grating interferometer," Spectrochimica Acta Part B vol. 62 (2007) pp. 626-630.
Davis et al., "Bridging the Micro-to-Macro Gap: A New Application for Micro X-Ray Fluorescence," Microsc Microanal., vol. 17(3) (Jun. 2011), pp. 410-417.
Detlefs et al., "Fast Chemical Contrast by X-ray Fluorescence Intensity Ratio Detection," Anal. Chem., https://doi.org/10.1021/acs.analchem.3c00623 (2023).
Dewulf et al., "Advances in the metrological traceability and performance of X-ray computed tomography," CIRP Annals—Manuf. Tech. vol. 00, 1-24 (2022).
Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages).
Dibernardo, "Non-disruptive techniques for depth profiling in photoemission spectroscopy," Nature Review Physics, https://doi.org/10.1038/s42254-021-00331-4 (2021).
Dittler et al., "A mail-in and user facility for X-ray absorption near-edge structure: the CEI-XANES laboratory X-ray spectrometer at University of Washington," J. Synch. Rad. vol. 26, eight pages, (2019).
Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).
Du et al., "Removal of artifacts caused by grating imperfections in X-ray phase contrast tomography," J. of Inst. vol. 16, P06039, doi.org/10.1088/1748-0221/16/06/P06039 (2021).
Erko et al., "X-ray Optics," Ch. 3 of "Handbook of Practical X-Ray Fluorescence Analysis," B. Beckhoff et al., eds. (Springer, Berlin, Germany, 2006), pp. 85-198.
Espes et al., "High-resolution X-ray source with advanced e-beam technology: pushing the resolution limitation for lab-scale NanoCT," Micros. Microanal., vol. 27 (Suppl. 1), pp. 1230 (2021).
Feng et al., "Reduction of Compton Background Noise for X-ray Fluorescence Computed Tomography with Deep Learning," Photonics, vol. 9, p. 108 (2022).
Fernández-Ruiz, "Txrf Spectrometry as a Powerful Tool for the Study of Metallic Traces in Biological Systems," Development in Analytical Chemistry, vol. 1 (2014), pp. 1-14.
Fisher et al., "Laminography in the lab: imaging planar objects using a conventional x-ray CT scanner," Meas. Sci. Technol., vol. 30, p. 035401 (2019).
Flenner et al., "Hard X-ray full-field nanoimaging using a direct photon-counting detector," J. Synch. Rad., https://doi.org/10.1107/S1600577522012103 (2022).
Gaur et al., "On the method of calibration of the energy dispersive EXAFS beamline and Indus-2 and fitting theoretical model to the EXAFS spectrum," Sadhana, vol. 36, No. 3 pp. 3390348 (2011).
Ge et al., "Investigation of the partially coherent effects in a 2D Talbot interferometer," Anal. Bioanal. Chem. vol. 401, (2011), pp. 865-870.
Ge et al., "Self-absorption correction on 2D X-ray fluorescence maps," Sci. Rep. 13, p. 7271, https://doi.org/10.1038/s41598-023-33383-w (2023).

Ghani et al., "A Phase Sensitive X-ray Brest Tomosynthesis System: Preliminary Patient Images with Cancer Legions," Phys. Med. Biol. https://doi.org/10.1088/1361-6560/ac2ea6 (2021).
Gonzales et al., "Angular Distribution of Bremsstrahlung Produced by 10-Kev And 20 Kev Electrons Incident an a Thick Au Target", in Application of Accelerators in Research and Industry, AIP Conf. Proc. 1221 (2013), pp. 114-117.
Gonzales et al., "Angular distribution of thick-target bremsstrahlung produced by electrons with initial energies ranging from 10 to 20 keV incident on Ag", Phys. Rev. A vol. 84 (2011): 052726.
Graetz et al., "Lenseless C-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.
Günther et al., "Full-field structured-illumination super-resolution X-ray transmission microscopy," Nature Comm. 10:2494 (2019) and supplementary information.
Gustschin et al., "High resolution and sensitivity bi-directional x-ray phase contrast imaging using 2D Talbot array illuminators," arXiv:2105.07347v1 [physics.med-ph] May 16, 2021.
Harasse et al., "Iterative reconstruction in x-ray computed laminography from differential phase measurements", Opt. Express. vol. 19 (2011), pp. 16560-16573.
Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.
Harasse et al., "X-ray Phase Laminography with Talbot Interferometer", in Developments in X-Ray Tomography VII, Proc. SPIE vol. 7804 (2010), 780411.
Hashimoto et al., "Improved reconstruction method for phase stepping data with stepping errors and dose fluctuations," Optics Express, vol. 28, No. 11, pp. 16363-16384 (2020).
Hasse et al., "New developments in laboratory-based x-ray sources and optics," Adv. In Laboratory-based X-Ray Sources, Optics, and Applications VI, ed. A.M. Khounsary, Proc. SPIE vol. 10387, 103870B-1 (2017).
Haug et al., A laboratory-based multifunctional near ambient pressure X-ray photoelectron spectroscopy system for electrochemical, catalytic, and cryogenic studies, Rev. Sci. Instr. vol. 94, 065104, https://doi.org/10.1063/5.0151755 (2023).
Heirwegh et al., "The focused beam X-ray fluorescence elemental quantification software package PIQUANT," Spectrochimica Acta Part B: Atomic Spectroscopy, https://doi.org/10/1016/j.sab.2022.106520 (2022).
Hemraj-Benny et al., "Near-Edge X-ray Absorption Fine Structure Spectroscopy as a Tool for Investigating Nanomaterials," Small, vol. 2(1), (2006), pp. 26-35.
Hennekam et al., "Trace metal analysis of sediment cores using a novel X-ray fluorescence core scanning method," Quaternary Int'l, https://doi.org/10.1016/j.quaint.2018.10.018 (2018).
Hirano et al., "X-ray zooming optics for analyzer-based multi-contrast computed tomography," J. Synch. Rad. vol. 29, https://doi.org/10.1107/S1600577522001412 (2022).
Holberg et al., "High-Resolution Table-Top NEXAFS Spectroscopy," Anal. Chem. https://10.1021/acs.analchem.1c04374 (2022).
Holfelder et al., "A double crystal von Hamos spectrometer for traceable x-ray emission spectroscopy," Rev. Sci. Instrum. vol 92, p. 123105 (2021).
Honma et al., Full-automatic XAFS Measurement System of the Engineering Science Research II beamline BL14B2 at Spring-8, 2011, AIP Conference Proceedings 1234, pp. 13-16.
Hoshino et al., "High-energy X-ray micro-laminography to visualize microstructures in dense planar object," J. Synch. Rad. https://doi.org/10.1107/S1600577522012176 (2022).
Howard et al., "High-Definition X-ray Fluorescence Elemental Mapping of Paintings," Anal. Chem., 2012, vol. 84(7), pp. 3278-3286.
Hu et al., "Improving small animal cone beam CT resolution by mitigating x-ray focal spot induced blurring via deconvolution," Phys. Med. Bio., in press, https://doi.org/10.1088/1361-6560/ac6b7a (2022).

(56) References Cited

OTHER PUBLICATIONS

Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.

Ihsan et al., "A microfocus X-ray tube based on a microstructured X-ray target", Nuclear Instruments and Methods in Physics Research B vol. 267 (2009) pp. 3566-3573.

Ishisaka et al., "A New Method of Analyzing Edge Effect in Phase Contrast Imaging with Incoherent X-rays," Optical Review, vol. 7, No. 6, (2000), pp. 566-572.

Ito et al., "A Stable In-Laboratory EXAFS Measurement System," Jap. J. Appl. Phys., vol. 22, No. 2, Feb. 1, 1983, pp. 357-360.

Itoh et al., "Two-dimensional grating-based X-ray phase-contrast imaging using Fourier transform phase retrieval," Op. Express, vol. 19, No. 4 (2011) pp. 3339-3346.

Jahrman et al., "Vacuum formed temporary spherically and toroidally bent crystal analyzers for x-ray absorption and x-ray emission spectroscopy," Rev. Sci. Inst. vol. 90, 013106 (2019).

Janssens et al., "Recent trends in quantitative aspects of microscopic X-ray fluorescence analysis," TrAC Trends in Analytical Chemistry 29.6 (Jun. 2010): 464-478.

Jiang et al., "X-Ray Phase-Contrast Imaging with Three 2D Gratings," Int. J. Biomed. Imaging, (2008), 827152, 8 pages.

Jin et al., "Development of an X-ray tube with two selective targets modulated by a magnetic field," Rev. Sci. Inst. vol. 90, 083105 (2019).

Kalasová et al., "Characterization of a laboratory-based X-ray computed nanotomography system for propagation-based method of phase contrast imaging," IEEE Trans. on Instr. and Meas., DOI 10.1109/TIM.2019.2910338 (2019).

Keyrilainen et al., "Phase contrast X-ray imaging of breast," Acta Radiologica, vol. 51 (8), (2010), pp. 866-884.

Khan et al., "Recent Trends in Applications of X-ray Photoelectron Spectroscopy (XPS) Technique in Coatings for Corrosion Protection," Chapter of "Recent Developments in Analytical Techniques for Corrosion Research," I. Toor (ed.), Springer Nature Switzerland AG https://doi.org/10.1007/978-3-030-89101-5_8 (2022).

Kido et al., "Bone Cartilage Imaging with X-ray Interferometry using a Practical X-ray Tube", in Medical Imaging 2010: Physics of Medical Imaging, Proc. SPIE vol. 7622 (2010), 762240.

Kim et al., "Observation of the Talbot Effect at Beamline 6C Bio Medical Imaging of the Pohang Light Source-II," J. Korean Phys. Soc., vol. 74, No. 10, pp. 935-940 (May 2019).

Kim et al., "A Simulation Study on the Transfer Characteristics of the Talbot Pattern Through Scintillation Screens in the Grating Interferometer," J. Rad. Sci. and Tech. 42(1), pp. 67-75 (2019).

Kim, "Talbot images of wavelength-scale amplitude gratings," Opt. Express vol. 20(5), (2012), pp. 4904-4920.

Kiranjot et al., "Surface and interface characterization of Ru/C/Ru trilayer structure using grazing incidence X-ray reflectivity and X-ray fluorescence," Surf. and Interface Analysis, doi: 10.1002/sia7016 (2021).

Kiyohara et al., "Development of the Talbot-Lau Interferometry System Available for Clinical Use", in International Workshop on X-ray and Neutron Phase Imaging with Gratings, AIP Cong. Proc. vol. 1466, (2012), pp. 97-102.

Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).

Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).

Kottler et al., "A two-directional approach for grating based differential phase contrast imaging using hard x-rays," Opt. Express vol. 15(3), (2007), pp. 1175-1181.

Kottler et al., "Dual energy phase contrast x-ray imaging with Talbot-Lau interferometer," J. Appl. Phys. vol. 108(11), (2010), 114906.

Kulow et al., "On the Way to Full-Field X-ray Fluorescence Spectroscopy Imaging with Coded Apertures," J. Anal. At. Spectrom. Doi: 10.1039/C9JA00232D (2019).

Kuwabara et al., "Hard-X-ray Phase-Difference Microscopy with a Low-Brilliance Laboratory X-ray Source", Appl. Phys. Express vol. 4 (2011) 062502.

Langhoff et al., "X-ray Sources," Ch. 2 of "Handbook of Practical X-Ray Fluorescence Analysis," B. Beckhoff et al., eds. (Springer, Berlin Heidelberg New York, 2006), pp. 33-82.

Leatham et al., "X-ray dark-field and phase retrieval without optics, via the Fokker-Planck equation," arXiv:2122.10999v1, physics.med-ph, Dec. 21, 2021.

Lei et al., "8-inch-diameter field of view for X-ray differential phase-contrast imaging," Nucl. Inst. and Methods in Physics Research A, https://doi.org/10.1016/j.nima.2021.165375 (2021).

Li et al., "Study on High Thermal Conductivity of X-ray Anode with Composite Diamond Substrate," J. Phys.: Conf. Ser., vol. 1300, 012115 (2019).

Li et al., "X-ray phase-contrast imaging using cascade Talbot-Lau interferometers," Proc. SPIE 10964 (2018), pp. 1096469-1-1096469-6.

Li et al., "Production and Heat Properties of an X-ray Reflective Anode Based on a Diamond Heat Buffer Layer," Materials vol. 13, p. 241 (2020).

Lin et al., "Quasi-Monte Carlo method for calculating X-ray scatter in CT," Op. Express, vol. 29, No. 9, p. 13746 (2021).

Lohmann et al., "An interferometer based on the Talbot effect," Optics Communications vol. 2 (1971), pp. 413-415.

Longo et al., "Flexible Plenoptic X-ray Microscopy," Photonics, vol. 9, p. 98 (2022).

Luani, "Optimization of e-beam and x-ray target geometry of a solid x-ray anode source," Uppsala Universitet, Dept. of Physics, Thesis for Masters degree in physics (2021).

Lübcke et al., "Soft X-ray nanoscale imaging using a sub-pixel resolution charge coupled device (CCD) camera," Rev. Sci. Instrum. vol. 90, 043111 (2019).

Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).

Malzer et al., "A laboratory spectrometer for high throughput X-ray emission spectroscopy in catalysis research," Rev. Sci. Inst. 89, 113111 (2018).

Mamyrbayev et al., "Staircase array of inclined refractive multi-lenses for large field of view pixel super-resolution scanning transmission hard X-ray microscopy," J. Synch. Rad., vol. 28 https://doi.org/10.1107/S1600577521001521 (2021).

Matsunaga et al., "Development of projection X-ray microscope with 10 nm spot size," Nodestr. Test. and Eval., https://doi.org.10.1080/10589759.2022.2083616 (2022).

Matsuyama et al., "Wavefront measurement for a hard-X-ray nanobeam using single-grating interferometry", Opt Express vol. 20 (2012), pp. 24977-24986.

Menzies et al., "Dual source X-ray and electron SEM system: Elemental mapping of an Epithermal gold-bearing sample from Karangahake, New Zealand," Microsc. Microanal., vol. 27 (Suppl. 1), pp. 456 (2021).

Miao et al., "Motionless phase stepping in X-ray phase contrast imaging with a compact source," Proceedings of the National Academy of Sciences, vol. 110(48), (2013), pp. 19268-19272.

Mijovilovich et al., "Analysis of trace metal distribution in plants with lab-based microscopic X-ray fluorescence imaging," Plant Methods, vol. 16, No. 82, 21 pages (2020).

Mizutani et al., X-ray microscopy for neural circuit reconstruction in 9th International Conference on X-Ray Microscopy, J. Phys: Conf. Ser. 186 (2009) 012092.

Modregger et al., "Grating-Based X-ray Phase Contrast Imaging," Ch. 3 of Emerging Imaging Technologies in Medicine, M. Anastasio & P. La Riviere, ed., CRC Press, Boca Raton, FL, (2012), pp. 43-56.

Momose et al., "Biomedical Imaging by Talbot-Type X-Ray Phase Tomography" in Developments in X-Ray Tomography V, Proc. SPIE vol. 6318 (2006) 63180T.

(56) References Cited

OTHER PUBLICATIONS

Momose et al., "Grating-Based X-ray Phase Imaging Using Multiline X-ray Source", Jpn. J. Appl. Phys. vol. 48 (2009), 076512.
Momose et al., "Phase Tomography by X-ray Talbot Interferometry for Biological Imaging" Jpn. J. Appl. Phys. vol. 45 2006 pp. 5254-5262.
Momose et al., "Phase Tomography Using X-ray Talbot Interferometer", in Synchrotron Radiation Instrumentation: Ninth International Conference, AIP Conf. Proc. vol. 879 (2007), pp. 1365-1368.
Momose et al., "Phase-Contrast X-Ray Imaging Using an X-Ray Interferometer for Biological Imaging", Analytical Sciences vol. 17 Supplement (2001), pp. i527-i530.
Momose et al., "Recent Progress in X-ray and Neutron Phase Imaging with Gratings," Quantum Beam Science, vol. 4, No. 9; doi:10.3390/qubs4010009 (2020).
Momose et al., "Sensitivity of X-ray Phase Imaging Based on Talbot Interferometry", Jpn. J. Appl. Phys. vol. 47 (2008), pp. 8077-8080.
Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.
Momose et al., "X-ray Phase Imaging—From Static Observation to Dynamic Observation—", in International Workshop on X-ray and Neutron Phase Imaging with Gratings AIP Conf. Proc. vol. 1466, (2012), pp. 67-77.
Momose et al., "X-ray Phase Imaging Using Lau Effect", Appl. Phys. Express vol. 4 (2011) 066603.
Momose et al., "X-Ray Phase Imaging with Talbot Interferometry", in "Biomedical Mathematics: Promising Directions in Imaging, Therapy Planning, and Inverse Problems", Y. Censor, M. Jiang & G.Wang, eds. (Medical Physics Publishing, Madison, WI, USA, 2010), pp. 281-320.
Momose et al., "X-ray phase tomography with a Talbot interferometer in combination with an X-ray imaging microscope", in 9th International Conference on X-Ray Microscopy, J. Phys: Conf. Ser. 186 (2009) 012044.
Momose et al., "X-ray Talbot Interferometry with Capillary Plates", Jpn. J. Appl. Phys. vol. 45 (2006), pp. 314-316.
Momose et al., "Four-dimensional X-ray phase tomography with Talbot interferometer and white synchrotron radiation: dynamic observation of a living worm", Opt. Express vol. 19 (2011), pp. 8423-8432.
Momose et al., "High-speed X-ray phase imaging and X-ray phase tomography with Talbot interferometer and white synchrotron radiation", Opt. Express vol. 17 (2009), pp. 12540-12545.
Momose et al., "Phase Imaging with an X-ray Talbot Interferometer", Advances in X-ray Analysis vol. 49(3) (2006), pp. 21-30.
Momose et al., "Demonstration of X-Ray Talbot Interferometry", Jpn. J. Appl. Phys. vol. 42 (2003), pp. L866-L868.
Momose et al., "Phase Tomography Using an X-ray Talbot Interferometer", in Developments in X-Ray Tomography IV, Proc. SPIE vol. 5535 (2004), pp. 352-360.
Momose, "Recent Advances in X-ray Phase Imaging", Jpn. J. Appl. Phys. vol. 44 (2005), pp. 6355-6367.
Morimoto et al., "Design and demonstration of phase gratings for 2D single grating interferometer," Optics Express vol. 23, No. 23, 29399 (2015).
Morimoto et al., "Development of multiline embedded X-ray targets for X-ray phase contrast imaging," XTOP 2012 Book of Abstracts, (Ioffe Physical-Technical Institute of the Russian Academy of Sciences, St. Petersburg, Russia, 2012), pp. 74-75.
Morimoto et al., "X-ray phase contrast imaging by compact Talbot-Lau interferometer with a signal transmission grating," 2014, Optics Letters, vol. 39, No. 15, pp. 4297-4300.
Munro et al., Design of a novel phase contrast imaging system for mammography, 2010, Physics in Medicine and Biology, vol. 55, No. 14, pp. 4169-4185.
Nango et al., "Talbot-defocus multiscan tomography using the synchrotron X-ray microscope to study the lacuno-canalicular network in mouse bone", Biomed. Opt. Express vol. 4 (2013), pp. 917-923.
Nemeth et al., "Laboratory von Hamos X-ray Spectroscopy for Routine Sample Characterization, " arvix:1607.08045v1 (2016).
Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Nojeh, "Carbon Nanotube Electron Sources: From Electron Beams to Energy Conversion and Optophononics", ISRN Nanomaterials vol. 2014 (2014): 879827.
Nykanen et al., "X-ray scattering in full-field digital mammography," Med. Phys. vol. 30(7), (2003), pp. 1864-1873.
O'Brien et al., "Recent Advances in X-ray Cone-beam Computed Laminography," J. X-ray Sci. and Tech., vol. 24, No. 5, pp. 691-707 (2016).
Ohba et al., "Laboratory-size x-ray microscope using Wolter mirror optics and an electron-impact x-ray source," Rev. Sci. Inst. 92, 093704 (2021).
Oji et al., Automatic XAFS measurement system developed at BL14B2 in SPring-8, Available online Nov. 15, 2011, Journal of Synchrotron Radiation, vol. 19, pp. 54-59.
Okolo, "A guide into the world of high-resolution 3D imaging: the case of soft X-ray tomography for the life sciences," Biochem. Soc. Trans., https://doi.org/10.1042/BST20210886 (2002).
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X-ray microspectroscopy," J. Royal Society Interface vol. 6 suppl. 5 (Oct. 6, 2009), pp. 6S649-6S658.
Otendal et al., A 9 keV electron-impact liquid-gallium-jet x-ray source, Rev. Sci. Instrum. vol. 79 (2008): 016102.
Oxford Instruments Inc., Series 5000 Model XTF5011 X-ray Tube information, Jun. 1998, 3 pages.
Pandeshwar et al., "Envelope modulated x-ray grating interferometry," Appl. Phys. Lett. 120, 193701 (2022).
Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).
Parrill et al., "GISAXS—Glancing Incidence Small Angle X-ray Scattering," Journal de Physique IV, vol. 3 (Dec. 1993), pp. 411-417.
Paunesku et al., "X-Ray Fluorescence Microprobe Imaging in Biology and Medicine," J. Cell. Biochem. vol. 99, pp. 1489-1502 (2006).
Pekel et al., "Geometric calibration of seven degree of freedom robotic sample holder for x-ray CT,"Proc. of SPIE 12304, 7th Int'l Conf. on Image Formation in X-Ray Computed Tomography, 123042L, doi:10.1117/12.2646492 (2022).
Pfeiffer et al., "Hard-X-ray dark-field imaging using a grating interferometer," Nature Materials vol. 7, (2008), pp. 134-137.
Pfeiffer et al., "Hard x-ray phase tomography with low brilliance x-ray sources," Phys. Rev. Lett. vol. 98, (2007), 108105.
Pfeiffer et al., "Phase retrieval and differential phase-contrast imaging with low-brilliance X-ray sources," Nature Physics vol. 2, (2006), pp. 258-261.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.

(56) References Cited

OTHER PUBLICATIONS

Poludniowski et al., "Technical Note: SpekPy v2.0—a software toolkit for modelling x-ray tube spectra," doi: 10.1002/MP.14945 (2021).
Potts, "Electron Probe Microanalysis", Ch. 10 of "A Handbook of Silicate Rock Analysis" (Springer Science + Business Media, New York, 1987), pp. 326-382.
Prewitt et al., "FIB Repair of 5X Reticles and Effects on IC Quality," Integrated Circuit Metrology, Inspection, and Process Control VII, Proc. SPIE vol. 1926 (1993), pp. 517-526.
Prewitt et al., "Focused ion beam repair: staining of photomasks and reticles," J. Phys. D Appl. Phys. vol. 26 (1993), pp. 1135-1137.
Prewitt et al., "Gallium Staining in FIB Repair of Photomasks," Microelectronic Engineering, vol. 21 (1993), pp. 191-196.
Pushie et al., "Elemental and Chemically Specific X-ray Fluorescence Imaging of Biological Systems," Chem. Rev. 114:17, 8499-8541 (2014).
Pushie et al., "Prion protein expression level alters regional copper, iron and zinc content in the mouse brain," Metallomics vol. 3, 206-214 (2011).
Qiao et al., "Single-shot x-ray phase-contrast and dark-field imaging based on coded binary phase mask," Appl. Phys. Lett. 119, 011105 (2021).
Qin et al., "Trace metal imaging with high spatial resolution: Applications in biomedicine," Metallomics, vol. 3 (Jan. 2011), pp. 28-37.
Redus et al., "Spectrometer configuration and measurement uncertainty in X-ray spectroscopy," X-Ray Spectrom., pp. 1-14 (2020).
Renaud et al., "Probing surface and interface morphology with Grazing Incidence Small Angle X-ray Scattering," Surface Science Reports, vol. 64:8 (2009), pp. 255-380.
Riege, "Electron Emission from Ferroelectrics—A Review", CERN Report Cern AT/93-18 (Cern, Geneva, Switzerland, Jul. 1993).
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Rutishauser, "X-ray grating interferometry for imaging and metrology," 2003, Eth Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS One, vol. 9, Issue 5 (May 2014) e93502.
Scholz, "X-ray Tubes and Monochromators," Technical Workshop EPIC, Universität Würzburg (2007); 41 slides, 2007.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Schunck et al., "Soft x-ray imaging spectroscopy with micrometer resolution," Optica vol. 8, No. 2, pp. 156-160 (2021).
Seddon-Ferretti et al., "HERMES—a GUI-based software tool for pre-processing of X-ray absorption spectroscopy data from laboratory Rowland circle spectrometers," J. Synch. Rad., vol. 29, https://doi.org/10.1107/S1600577521012583, pp. 1-4 (2022).
Seifert et al., "Talbot-Lau x-ray phase-contrast setup for fast scanning of large samples," Sci. Rep. 9:4199, pp. 1-11 (2019).
Shi et al., "Laboratory X-ray interferometry imaging with a fan-shaped source grating," Optics Lett., doi.org/10.1364/OL.426867 (2021).
Shimura et al., "Hard x-ray phase contrast imaging using a tabletop Talbot-Lau interferometer with multiline embedded x-ray targets", Opt. Lett. vol. 38(2) (2013), pp. 157-159.
Simionovici et al., "X-ray focusing methods for X-ray absorption spectroscopy," Int'l Tables Crystallog. vol. I, https://doi.org/10.1107/S1574870721006844 (2022).
Soltau et al., "Coherent Diffractive Imaging with Diffractive Optics," Phys. Rev. Lett. 128, 223901 (2022).

Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Stampanoni et al., "The First Analysis and Clinical Evaluation of Native Breast Tissue Using Differential Phase-Contrast Mammography," Investigative Radiology, vol. 46, pp. 801-806. pub Dec. 2011.
Storm et al., "Optimizing the energy bandwidth for transmission full-field X-ray microscopy experiments," J. Synch. Rad., vol. 29, https://doi.org/10.1107/S1600577521011206, pp. 1-10 (2022).
Streli et al., "Micro-X-ray fluorescence spectroscopy," Chapter 1.9.f of "Imaging Modalities for Biological and Preclinical Research: A compendium, vol. 1, Part I: Ex vivo biological imaging," Ed. Walter et al., 8 pages, doi:10.1088/978-0-7503-3059-6ch42 (2021).
Stupple et al., "Modeling of Heat Transfer in an Aluminum X-Ray Anode Employing a Chemical Vapor Deposited Diamond Heat Spreader," J. Heat Transfer, Vo. 140, 124501-1-5 (Dec. 2018).
Sunday et al., "X-ray Metrology for the Semiconductor Industry Tutorial," J. Res. Nat'l Inst. Stan. vol. 124: 124003 (2019); https://doi.org/10.6028/jres.124.003.
Takeda et al., "Differential Phase X-ray Imaging Microscopy with X-ray Talbot Interferometer" Appl. Phys. Express vol. 1 (2008) 117002.
Takeda et al., "X-Ray Phase Imaging with Single Phase Grating", Jpn. J. Appl. Phys. vol. 46 (2007), pp. L89-L91.
Talbot, "Facts relating to optical science No IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tanaka et al., "Propagation-based phase-contrast imaging method for full-field X-ray microscopy using advanced Kirkpatrick-Baez mirrors," Op. Express vol. 31, No. 16, pp. 26135-26144 (2023).
Tang et al., "Detailed analysis of the interference patterns measured in lab-based X-ray dual-phase grating interferometry through wave propagation simulation," Opt. Ex. vol. 31, No. 2, pp. 1677-1691 (2023).
Tao et al., "Factors Affecting the Spatial Resolution in 2D Grating-Based X-Ray Phase Contrast Imaging," Frontiers in Physics, doi: 10.3389/fphy.2021.672207 (2021).
Tao et al., "Moire artifacts reduction in Talbot-Lau X-ray phase contrast imaging using a three-step iterative approach," Opt. Ex. vol. 30, No. 20, pp. 35096-35111 (2022).
Taphorn et al., "Grating-based spectral X-ray dark-field imaging for correlation with structural size measures," Sci. Reports, vol. 10, 13195 (2020).
Tebina et al., "X-Ray Fault Injection: Reviewing Defensive Approaches from a Security Perspective," 2022 IEEE Int'l Symp. Defect and Fault Tolerances in VLSI and Nanotechnology Systems (DFT), doi: 10.1109/DFT56152.2022.9962362 (2022).
Terzano et al., Recent advances in analysis of trace elements in environmental samples by X-ray based techniques (IUPAC Technical Report), Pure Appl. Chem. 2019.
Tessarini et al., "Semi-classical Monte Carlo algorithm for the simulation of X-ray grating interferometry," Sci. Rep. vol. 12, p. 2485 (2022).
Tetef et al., "Unsupervised Machine Learning for Unbiased Chemical Classification in X-ray Absorption Spectroscopy and X-ray Emission Spectroscopy," Royal Soc. of Chem. Doi: 10.33774/chemrxiv-2021-5tvrv (2021).
Titus et al., "Advancing the in-situ characterization of light elements via X-ray absorption spectroscopy using superconducting detectors," Microsc. Microanal., vol. 27, (Suppl. 1), pp. 2890 (2021).
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Topperwien et al., "Multiscale x-ray phase-contrast tomography in a mouse model of transient focal cerebral ischemia," Biomed. Op. Express, vol. 10, No. 1, Jan. 2019, pp. 92-103.

(56) References Cited

OTHER PUBLICATIONS

Tsuji et al., "X-Ray Spectrometry: Recent Technological Advances," John Wiley & Sons Ltd. Chichester, West Sussex, UK 2004), Chapters 1-7.
Tucker, "Design of X-Ray Source for Real-Time Computed Tomography," Dissertation, Missouri Univ. of Sci. and Tech., Scholars' Mine, 104 pages (2020).
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vila-Comamala et al., "High sensitivity X-ray phase contrast imaging by laboratory grating-based interferometry at high Talbot order geometry," Op. Express vol. 29, No. 2, pp. 2049-2064 (2021).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al., "Fabrication of Multiple Slit Using Stacked-Sliced Method for Hard X-ray Talbot—Lau Interferometer", Jpn. J. Appl. Phys. vol. 47 (2008), pp. 7412-7414.
Wang et al., "Advantages of intermediate X-ray energies in Zernike phase contrast X-ray microscopy," Biotech. Adv., vol. 31 (2013) pp. 387-392.
Wang et al., "High beam-current density of a 10-keV nano-focus X-ray source," Nucl. Inst. and Meth. A940, 475-478 (2019).
Wansleben et al., "Photon flux determination of a liquid-metal jet x-ray source by means of photon scattering," arXiv:1903.06024v1, Mar. 14, 2019.
Weitkamp et al., "Design aspects of X-ray grating interferometry," in International Workshop on X-ray and Neutron Phase Imaging with Gratings AIP Conf. Proc. vol. 1466, (2012), pp. 84-89.
Weitkamp et al., "Hard X-ray phase imaging and tomography with a grating interferometer," Proc. SPIE vol. 5535, (2004), pp. 137-142.
Weitkamp et al., "X-ray wavefront diagnostics with Talbot interferometers," International Workshop on X-Ray Diagnostics and Scientific Application of the European XFEL, Ryn, Poland, (2010), 36 slides.
Weitkamp et al., Tomography with grating interferometers at low-brilliance sources, 2006, SPIE, vol. 6318, pp. 0S-1 to 0S-10.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Wen et al., "Fourier X-ray Scattering Radiography Yields Bone Structural Information," Radiology, vol. 251 (2009) pp. 910-918.
Wen et al., "Single-shot x-ray differential phase-contrast and diffraction imaging using two-dimensional transmission gratings," Op. Lett. vol. 35, No. 12, (2010) pp. 1932-1934.
Wilde et al., "Modeling of an X-ray grating-based imaging interferometer using ray tracing," Op. Express vol. 28, No. 17, p. 24657 (2020).
Wilde et al., "Statistical optics modeling of dark-field scattering in X-ray grating interferometers: Part 1. Theory," Op. Express vol. 29, No. 25, p. 40891 (2021).
Wilde et al., "Statistical optics modeling of dark-field scattering in X-ray grating interferometers: Part 2. Simulation," Op. Express vol. 29, No. 25, p. 40917 (2021).
Withers et al., "X-ray computed tomography," Nature Reviews | Methods Primers, vol. 1, No. 18, pp. 1-21 (2021).
Witte et al., "From 2D STXM to 3D Imaging: Soft X-ray Laminography of Thin Specimens," Nano Lett. vol. 20, pp. 1305-1314 (2020).

Wittry et al., "Properties of fixed-position Bragg diffractors for parallel detection of x-ray spectra," Rev. Sci. Instr. Vol. 64, pp. 2195-2200 (1993).
Wobrauschek et al., "Energy Dispersive, X-Ray Fluorescence Analysis," Encyclopedia of Analytical Chemistry, R.A. Meyers, Ed. (Wiley 2010).
Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.
Woicik et al., "Soft X-ray absorption spectra," Int. Tables Crystallogr. vol. 1, https://doi.org.10.1107/S1574870720008484 (2023).
Xiao et al., "TXM-Sandbox: an open-source software for transmission X-ray microscopy data analysis," J. Synch. Rad., vol. 29, https://doi.org/10.1107/S1600577521011978, p. 1-10 (2022).
Xu et al., "Comparison of image quality in computed laminography and tomography," Op. Express, vol. 20, No. 2, pp. 794-806 (2012).
Xu et al., "Synchrotron radiation computed laminography for polymer composite failure studies," J. Synch. Rad., vol. 17, pp. 222-226 (2010).
Yamada et al., "Compact full-field hard x-ray microscope based on advanced Kirkpatrick-Baez mirrors," Optica, vol. 7, No. 4 pp. 367-370 (2020).
Yamamoto, "Fundamental physics of vacuum electron sources", Reports on Progress in Physics vol. 69, (2006), pp. 181-232.
Yan et al., "X-ray source design optimization using differential evolution algorithms—A case study," Rev. Sci. Instrum. 93, 053101 (2022).
Yashiro et al., "Distribution of unresolvable anisotropic microstructures revealed in visibility-contrast images using x-ray Talbot interferometry", Phys. Rev. B vol. 84 (2011), 094106.
Yashiro et al., "Hard x-ray phase-imaging microscopy using the self-imaging phenomenon of a transmission grating", Phys. Rev. A vol. 82 (2010), 043822.
Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.
Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.
Yashiro et al., "Efficiency of capturing a phase image using cone-beam x-ray Talbot interferometry", J. Opt. Soc. Am. A vol. 25 (2008), pp. 2025-2039.
Yashiro et al., "On the origin of visibility contrast in x-ray Talbot interferometry", Opt. Express (2010), pp. 16890-16901.
Yashiro et al., "Optimal Design of Transmission Grating for X-ray Talbot Interferometer", Advances in X-ray Analysis vol. 49(3) (2006), pp. 375-379.
Yashiro et al., "X-ray Phase Imaging Microscopy using a Fresnel Zone Plate and a Transmission Grating", in The 10th International Conference on Synchrotron Radiation Instrumentation, AIP Conf. Proc. vol. 1234 (2010), pp. 473-476.
Yashiro et al., "Hard-X-Ray Phase-Difference Microscopy Using a Fresnel Zone Plate and a Transmission Grating", Phys. Rev. Lett. vol. 103 (2009), 180801.
Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).
Zan et al., "High-resolution multicontrast tomography with an X-ray microarray anode-structured target source," PNAS, doi.org10.1073/pnas.2103126118 (2021).
Zanette et al., "Two-Dimensional X-Ray Grating interferometer," Phys. Rev. Lett. vol. 105 (2010) pp. 248102-1 248102-4.
Zeeshan et al., "In-house setup for laboratory-based x-ray absorption fine structure spectroscopy measurements," Rev. Sci. Inst. 90, 073105 (2019).
Zeng et al., "Glass Monocapillary X-ray Optics and Their Applications in X-Ray Microscopy," X-ray Optics and Microanalysis: Proceedings of the 20th International Congress, AIP Conf. Proc. Vol. 1221, (2010), pp. 41-47.

(56) References Cited

OTHER PUBLICATIONS

Zhan et al., "A Lightweight Method for Detecting IC Wire Bonding Defects in X-ray Images," Micromachines, vol. 14, p. 1119, https://doi.org/10.3390/mi14061119 (2023).

Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.

Zhang et al., "Laboratory-scale X-ray absorption spectrometer with a cylindrical Johansson crystal analyzer," Nuclear Inst. and Methods in Physics Research, A (2023), doi: https://doi.org/10.1016/j.nima.2023.168067 (2023).

Zhang et al., "Measurement of the inner diameter of monocapillary with confocal X-ray scattering technology based on capillary X-ray optics, " Appl. Opt. (Jan. 8, 2019), doc ID 351489, pp. 1-10.

Zhao et al., "X-ray wavefront sensing and optics metrology using a microfocus x-ray grating interferometer with electromagnetic phase stepping," Appl. Phys. Lett. 120, 181105 (2022).

Zhou et al., "A study of new type electric field modulation multi-target X-ray source," Nucl. Inst. and Methods in Physics Research A, https://doi.org/10.1016/j.nima.2020.164342 (2020).

Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).

Zhu et al., "Optical Wafer Defect Inspection at the 10 nm Technology Node and Beyond," 2022 Int. Extrem. Manuf. In press https://doi.org/10.1088/2631-7990/ac64d7 (2022).

Arsana et al., "Laboratory Liquid-Jet X-ray Microscopy and X-ray Fluorescence Imaging for Biomedical Applications," Int'l J. Mol. Sci., Vo. 25, p. 920 (2024).

De Pauw et al., "A review of laboratory, commercially available, and facility based wavelength dispersive X-ray fluorescence spectrometers," J. Anal. At. Spectrom., doi: 10.1039/d3ja00315a (2023).

Fahmi et al., "Biological applications of X-ray fluorescence microscopy: exploring the subcellular topography and speciation of transition metals," Current Opinion in Chem. Bio. vol. 11, pp. 121-127 (2007).

Greczynski et al., "Binding energy referencing in X-ray photoelectron spectroscopy," Nature Reviews Mat'ls, doi.org/10.1038/s41578-024-00743-5 (2024).

Hayashi et al., "Wave-dispersive x-ray spectrometer for simultaneous acquisition of several characteristic lines based on strongly and accurately shaped Ge crystals, " Rev. Sci. Instr. vol. 79, 033110 (2008).

Holden et al., "Probing Sulfur Chemical and Electronic Structure with Experimental Observation and Quantitative Theoretical Prediction of K# and Valence-to -Core K# X-ray Emission Spectroscopy," J. Phys. Chem. A doi: 10.1021/acs.jpca.0c04195 (2020).

Hönlcke et al., "Reference-free X-ray fluorescence analysis with a micrometer-sized incident beam," Nanotechnology, https://doi.org/10.1088/1361-6528/ad3aff (2024).

Masteghin et al., "Benchmarking of X-Ray Fluorescence Microscopy with Ion Beam Implanted Samples Showing Detection Sensitivity of Hundreds of Atoms," Small Methods, doi: 10.1002/smtd.202301610 (2024).

McRae et al., "In Situ Imaging of Metals in Cells and Tissues," Chem Rev. vol. 109, doi:10.1021/cr900223a (2009).

Morvay, "Chemical composition depth profiling of thin films using x-ray reflectometry and fluorescence," Ph.D. thesis, Masaryk University, Brno, Czech Republic (2024).

Novichkov et al., "Laboratory-based X-ray spectrometer for actinide science," J. Synch. Rad. vol. 30, doi.org/10.1107/S1600577523006926 (2023).

Shafkat et al., "Assessing Compatibility of Advanced IC Packages to X-Ray Based Physical Inspection," Elec. Device Failure Analysis, vol. 26, No. 3, pp. 14-24 (2024).

Watanabe et al., "X-ray fluorescence micro-tomography and laminography using an x-ray scanning microscope," J. Phys: Conf. Series 186, 012022 (2009).

Yuan at al., "Micro X-ray fluorescence device based on monocapillary ellipsoidal lens for thin film thickness measurements," Nucl. Inst. Meth. Phys. Res. A, vol. 1058, p. 168923 (2024).

Zhao et al., "Applications of the non-negative least-squares deconvolution method to analyze energy-dispersive x-ray fluorescence spectra," Appl. Op., Vo 62, No. 20, pp. 5556-5564 (2023).

\* cited by examiner

X-RAY FLUORESCENCE SYSTEM AND X-RAY SOURCE WITH ELECTRICALLY INSULATIVE TARGET MATERIAL

CLAIM OF PRIORITY

This application claims the benefit of priority to U.S. Provisional Appl. No. 63/268,778 filed on Mar. 2, 2022 and incorporated in its entirety by reference herein.

STATEMENT REGARDING FEDERALLY SPONSORED R&D

This invention was made with Government support under Contract Nos. NIH R43GM112287 and NIH R44GM112413, awarded by the National Institute of Health. The Government has certain rights in the invention.

BACKGROUND

Field

This application relates generally to x-ray fluorescence systems.

Description of the Related Art

X-ray fluorescence (XRF) analysis of materials comprising multiple elements can experience problems due to spectral interference, where the difference in energy between characteristic x-ray fluorescence lines of different elements is less than or compatible with the resolution of the spectrometer used. Spectral interference is particularly problematic when an energy dispersive x-ray detector is used for lower energy x-ray fluorescence lines (e.g., <5 keV) because most elements in the periodic table have characteristic x-ray lines of energies less than 5 keV, including K x-ray lines of lower Z elements, and L and M x-ray lines of higher Z elements. In addition, the energy resolution of the energy dispersive detector, such as a silicon drift detector, typically ranges from about 50 eV to about 120 eV in the low x-ray energy range. This problem is exacerbated when quantifying an element of low concentration having spectral interference with an element of high concentration in the same sample.

SUMMARY

Certain implementations described herein provide a system comprising a stage configured to support a sample comprising at least first and second atomic elements. The first atomic element has a first characteristic x-ray line with a first energy and the second atomic element has a second characteristic x-ray line with a second energy, the second energy greater than the first energy. The first energy and the second energy are lower than 8 keV and are separated from one another by less than 1 keV. The system further comprises an x-ray source comprising at least one target material configured to produce x-rays having a third energy between the first and second energies. The system further comprises at least one x-ray optic configured to receive and focus at least some of the x-rays from the x-ray source as an x-ray beam to illuminate the sample. At least 70% of the x-ray beam has x-ray energies that are below the second energy. The system further comprises at least one x-ray detector configured to detect fluorescence x-rays produced by the sample in response to being irradiated by the x-ray beam.

Certain implementations described herein provide an x-ray source comprising an electrically insulating target material having a thickness less than 10 microns. The target material is configured to emit x-rays upon being impinged by electrons accelerated by an accelerating voltage in a range of 5 kVp to 30 kVp. The x-ray source further comprises a diamond substrate material in thermal communication with the target material. The diamond substrate material is configured to transfer heat away from the target material, the heat generated by the target material being impinged by the electrons.

DETAILED DESCRIPTION

Figure 1A:
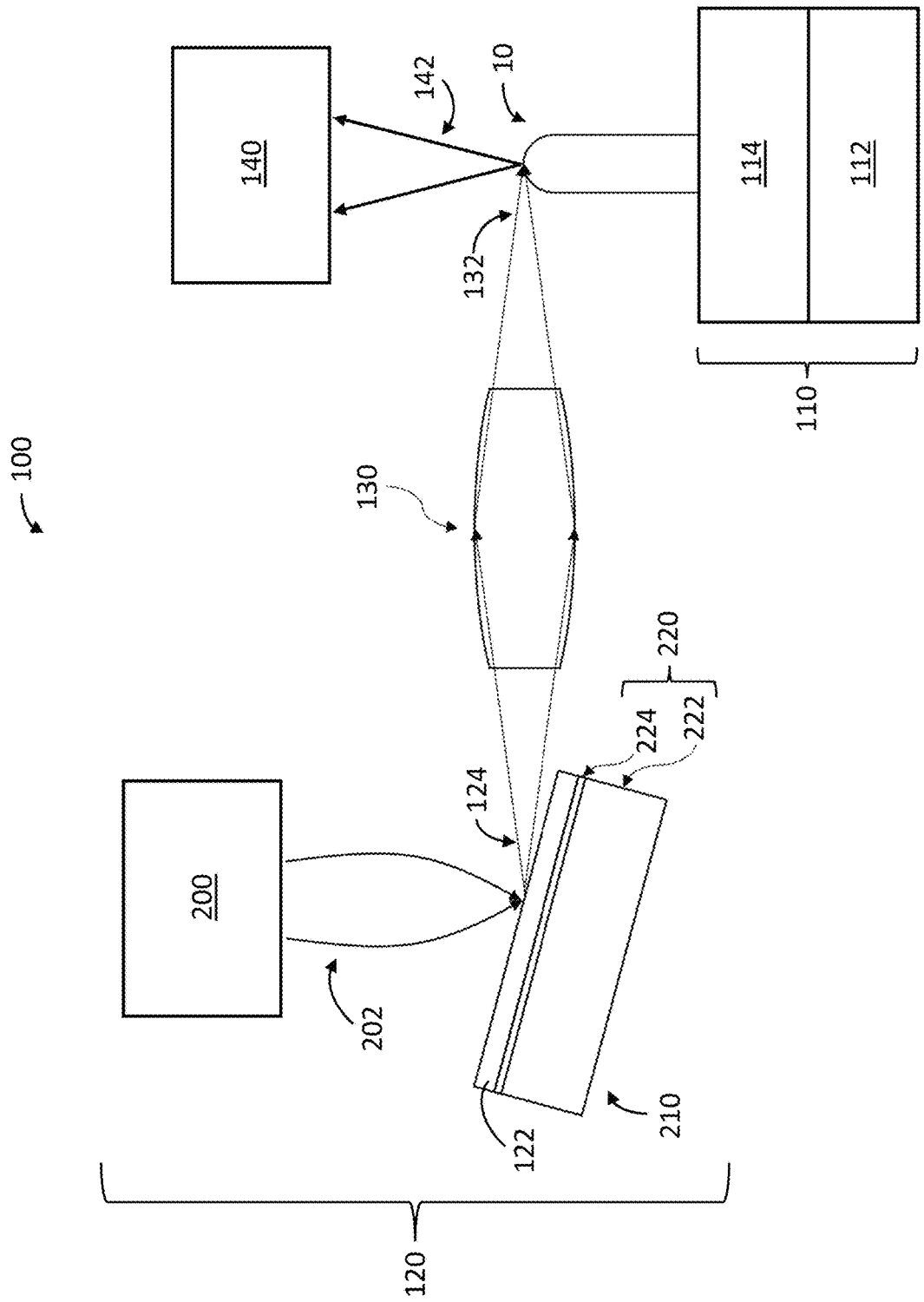
FIGS. 1A and 1B schematically illustrate two examples of an x-ray fluorescence measurement system in accordance with certain implementations described herein.

One example of XRF analysis that can experience issues due to spectral interference is the accurate measurement of Ag concentration in lead-free solder bumps in electronic packages that comprises tin (Sn) and silver (Ag), an important metrology/inspection analysis in manufacturing electronic packages using SnAg-based solder bumps. It can be difficult to use an EDS (energy dispersive spectrometer), such as silicon drift detector (SDD), to accurately quantify the concentration of Ag in SnAg solder bumps (e.g., microbumps). First, the concentration of Ag (e.g., in a range of 1% to 3%) is typically much smaller than the concentration of Sn (e.g., in a range greater than 97%). Second, the energy difference between the Sn Lγ x-ray line (e.g., 3.045 keV) and either of the Ag Lα, Lβ x-ray lines (e.g., energies of 2.984 keV and 3.15 keV, respectively) is less than the energy resolution of conventional EDS detectors, and thus there is strong spectral overlap.

Though a wavelength dispersive spectrometer (WDS) can have sufficient energy resolution to reduce the spectral overlap, WDS typically collects fluorescence x-rays with significantly smaller collection solid angles than does EDS, typically ranging from 10× to 500× smaller. Quantification of Ag concentration utilizes a sufficiently large number of Ag characteristic x-ray lines to meet Poisson statistic constraints, and WDS is typically much slower in data acquisition than EDS and can be too slow to meet the desired throughput for accurate measurement of Ag concentration in SnAg microbumps. Additionally, XRF measurement of Ag content in SnAg solder bumps in air with EDS can suffer problems due to the spectral overlap of Ag L x-ray lines and argon (Ar) K x-ray lines (e.g., energy of 3.19 keV) from Ar present in the air. Although data analysis with peak fitting of the overlapping spectral x-ray lines can be used to mitigate some of the spectral overlap problems in Ag concentration measurement, spectral overlap still creates uncertainty in accurate XRF measurement of Ag concentration.

In some applications (e.g., metrology of Ag concentration in SnAg microbumps in semiconductor packages), small spot analysis (e.g., x-ray spot widths in a range of 2 microns to 20 microns) is used. Such small spot sizes can further impose difficulty in accurate XRF measurements of Ag concentration due to small analysis volume and small focus spot sizes with small x-ray flux. Compared with SEM-EDS, which can achieve high spatial resolution, XRF offers an advantage with higher signal to background ratio and also can operate in ambient pressure.

Because of these problems, current spectroscopy (e.g., XRF and SEM-EDS) methods struggle to adequately measure the Ag content in solders.

Although the fluorescence yield of the Sn Lγ x-ray line is about 23×less than that of the Ag Lα x-ray line, the high concentration ratio of Sn/Ag in SnAg solder bumps (e.g., a concentration ratio of about 50×) can lead to Sn Lγ x-ray line intensities higher than that of the Ag Lα x-ray line in x-ray spectra generated by conventional x-ray excitation beams. Certain implementations described herein provide an x-ray excitation beam configured to illuminate (e.g., irradiate) SnAg solder structures of a sample and generate the Ag Lα and Lβ x-ray lines with intensities that are at least comparable with or larger than the intensity of the Sn Lγ x-ray line.

Certain implementations described herein provide microanalytical x-ray applications at these lower energy x-ray lines utilizing x-ray optics with a solid angle of collection that increases as the inverse square of the x-ray energy. For example, the x-ray source can comprise a W-containing target which is impinged by an electrons having an acceleration voltage in a range of 8 kVp to 20 kVp, and the x-ray optic can comprise a capillary focusing (e.g., ellipsoid) x-ray optic with sufficient demagnification to get a sufficiently small spot size and a fluorescence x-ray detector optimized to collect fluorescence x-rays having energies in a range of 3.5 keV to 4 keV. In certain implementations, the x-ray optic contains an internal multilayer coating that substantially monochromatizes the polychromatic x-rays produced by the W-containing target of the x-ray source. In certain other implementations, the internal surface of the x-ray optic is uncoated or is coated with a material having a high atomic number, such as platinum.

Certain implementations described herein generate a focused x-ray excitation beam (e.g., having a spot size in a range of 1 micron to 25 microns) for analyzing small SnAg solder structures (e.g., bumps; microbumps), To avoid spectral interference of Ar with Ag L x-ray lines, the amount of Ar atoms in the excitation x-ray beam path can be reduced (e.g., by performing the XRF measurements in vacuum or by flushing $N_2$ or He along and/or in the excitation x-ray beam path near the analysis area, for example, in front of the x-ray detector).

To achieve an Ag Lα x-ray line intensity that is at least comparable with or larger than the Sn Lγ x-ray line intensity, certain implementations described herein comprise an x-ray source and an x-ray optic configured to produce an x-ray excitation beam having a spectrum with a high percentage of x-rays of energies between the Ag L absorption edge (e.g., at about 3.35 keV) and the Sn L absorption edge (e.g., at about 3.93 keV). For small spot analysis, certain implementations utilize an x-ray focusing optic configured to focus x-rays to a spot size in a range of 1 micron to 25 microns. An energy resolving detector system, such as a silicon drift detector, can be used as the fluorescence x-ray detector.

Figure 1B:
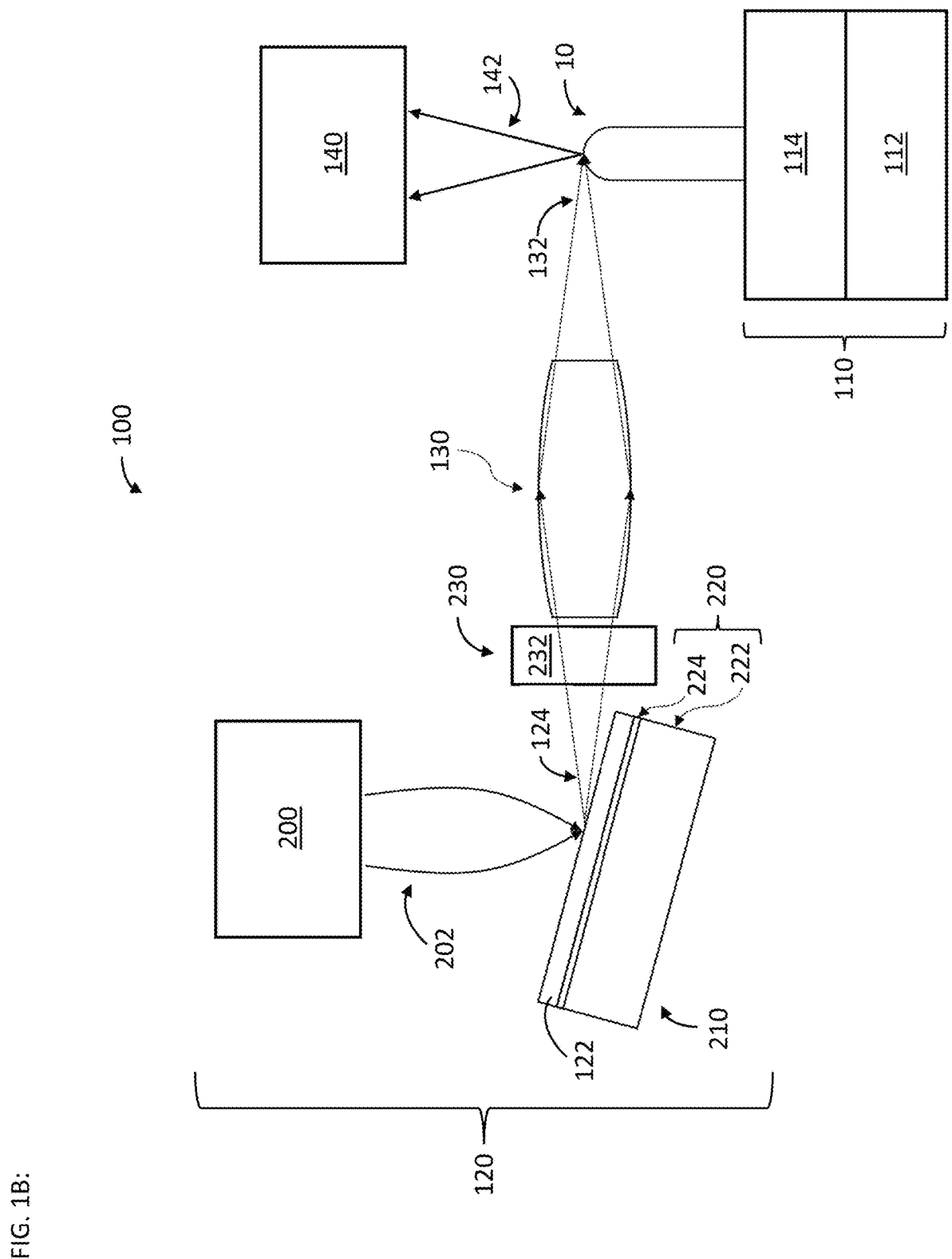

FIGS. 1A and 1B schematically illustrate two examples of an x-ray fluorescence measurement system 100 in accordance with certain implementations described herein. The system 100 is configured to analyze a sample 10 comprising at least first and second atomic elements. The first atomic element has a first characteristic x-ray line with a first energy, the second atomic element has a second characteristic x-ray line with a second energy, and the second energy greater than the first energy. The first energy and the second energy can be in a range lower than 8 keV (e.g., lower than 6 keV; lower than 5 keV) and are separated from one another by less than 1 keV. The system 100 comprises a stage 110 configured to support the sample 10 comprising the at least first and second atomic elements. The system 100 further comprises an x-ray source 120 comprising at least one target material 122 configured to produce x-rays 124 with a third energy between the first and second energies. The system 100 further comprises at least one x-ray optic 130. In certain implementations, the x-ray optic has a cut-off energy that is 50% to 100% of an absorption edge energy associated with the second characteristic x-ray line. The at least one x-ray optic 130 is configured to receive at least some of the x-rays 124 from the x-ray source 120 and to direct (e.g., focus) at least some of the received x-rays 124 as an x-ray beam 132 (e.g., an x-ray excitation beam) onto the sample 10. For example, at least 70% of the x-rays of the excitation beam can have x-ray energies that are below the second energy. The system 100 further comprises at least one x-ray detector 140 configured to detect fluorescence x-rays 142 produced by the sample 10 in response to being illuminated (e.g., irradiated) by the x-ray beam 132.

Sample Stage

In certain implementations, the stage 110 comprises at least one substage 112 that is motorized and computer-controlled (e.g., comprising an electromechanical system; goniometer; electromechanical motion driver; rotary motor; stepper motor; motor with encoder; linear motion driver with worm drive). The at least one substage 112 can be configured to linearly translate the sample 10 along one, two, or three directions (e.g., x-, y-, and z-direction substages 112 that can move the sample 10 along substantially perpendicular directions, one of which is substantially perpendicular to a surface of the sample 10). The at least one substage 112 can be further configured to rotate the sample 10 about at least one rotation axis. For example, the rotation axis can be substantially perpendicular to a surface of the sample 10 such that rotation of the sample 10 modifies the azimuthal angle along which the x-ray beam 132 propagates to illuminate (e.g., irradiate) the sample 10. For another example, the rotation axis can be substantially parallel to a surface of the sample 10 such that rotation of the sample modifies the tilt angle between the surface of the sample 10 and the propagation direction of the x-ray beam 132. In certain implementations, the at least one substage comprises at least one goiniometer.

In certain implementations, the stage 110 further comprises a sample mount 114 on the at least one substage 112, the sample mount 114 configured to hold the sample 10. For example, the sample mount 114 can be configured to hold a sample 10 comprising a substantially planar integrated circuit wafer such that a normal direction to the wafer is substantially parallel to a linear translation direction and/or a rotation axis of the at least one substage 112.

X-Ray Source

In certain implementations, the x-ray source 120 comprises at least one electron beam source 200 configured to generate an electron beam 202 and at least one x-ray target 210 (e.g., anode) configured to be impinged by the electron beam 202 and comprising the at least one target material 122. The at least one target material 122 is configured to generate the x-rays 124 in response to the electron beam 202. The at least one electron beam source 200 can comprise an electron source (e.g., dispenser cathode; lanthanum hexaboride; tungsten pin; not shown) and electron optics (e.g., three grid stacks; electromagnetic optics; not shown) configured to focus the at least one electron beam 202 onto the at least one x-ray target 210. The spot size of the electron beam 202 at the at least one target material 122 (e.g., the lateral width along a surface of the x-ray target 210) and/or the spot size of the x-ray generating region of the at least one target material 122 (e.g., the lateral width along a surface of the target material 122) can be in a range of less than or equal to 100 microns (e.g., less than or equal to 1 micron; 1 micron to 5 microns; 5 microns to 20 microns; 20 microns to 100 microns). The at least one electron beam source 200 can be operated in the range of 5 kVp to 30 kVp (e.g., 10 kVp to 15 kVp; 15 kVp to 20 kVp; 20 kVp to 30 kVp). The x-ray source 120 can be a reflection-type x-ray source having a power in a range of 10 W to 2 kW (e.g., 10 W to 30 W; 30 W to 50 W; 50 W to 100 W; 100 W to 2 kW). In certain implementations in which the x-ray source 120 comprises a reflection x-ray source, the at least one target material 122 is under vacuum and the x-ray source 120 does not have a window, while in certain other such implementations, the x-ray source 120 comprises an exit window (e.g., comprising beryllium or silicon nitride; 25 microns to 500 microns in thickness; not shown) through which the generated x-rays 124 propagate.

In certain implementations, the at least one target material 122 is has low electrical conductivity or is electrically insulative (e.g., ceramic; glass). For example, the at least one target material 122 can comprise at least one calcium-containing material, examples of which include but are not limited to: Ca, $CaB_6$, CaO, calcium carbide, calcium fluoride (CaF), or other compounds of calcium or ceramic formulations of calcium. Ceramics are generally not used as x-ray target materials because they are insulators and can charge up under electron bombardment. Furthermore, ceramics are alloys of materials, which have lower percentages of the atomic element generating the x-rays of interest as compared to the pure material, so the characteristic x-ray lines are weaker from alloys as compared to the pure material. For these reasons, most x-ray target materials are electrically conductive pure metals, such as Rh, Au, Pd, W, etc. With a thin layer of low electrical conductivity ceramic materials (e.g., thickness less than 5 microns or less than 1 micron), energetic electrons used for generating x-rays can tunnel through and thus these ceramic materials can be used for the target material, provided an electrically conductive path is provided.

The x-rays 124 generated by the Ca-containing material in response to an electron beam 202 in a range of 5 kVp to 30 kVp include Ca K x-ray line x-rays as a large fraction of the x-ray spectrum on top of continuum (e.g., Bremsstrahlung) radiation. The energy of the Ca Kα x-ray lines are above the Ag L absorption edges and are below the Sn L absorption edges, so these x-rays 124 are efficient in generating Ag L-line fluorescence x-rays from SnAg solder structures of the sample 10 while not generating Sn L-line fluorescence x-rays. The x-rays 124 with energies greater than the Sn L absorption edge can be used to generate Sn L fluorescence x-rays and Ag fluorescence x-rays. To achieve measurement of the Sn/Ag ratio, these higher energy x-rays can be only a fraction of the amount of Ca Kα x-ray lines reaching the sample. Because the Ca Kβ x-ray line is strong, a filter can be used to substantially reduce the Ca Kβ x-ray line. The relatively weak continuum x-rays 124 from the Ca target can be used for Sn excitation.

In certain other implementations, the at least one target material 122 comprises at least one material containing a material having a high atomic number (e.g., Z greater than 42), examples of which include but are not limited to: tungsten (W), rhodium (Rh), and molybdenum (Mo). The x-rays 124 can be generated by the target material in response to an electron beam 202 in a range of 6 kVp to 20 kVp (e.g., about 10 kVp). In certain such implementations, as schematically illustrated by FIG. 1B, the system 100 further comprises at least one filter 230 comprising at least one filter material 232 positioned in the path of the x-rays 124 propagating from the x-ray source 120 to the at least one x-ray optic 130 and/or in the path of the x-ray beam 132 propagating from the at least one x-ray optic 130 to the sample 10. The x-rays impinging the at least one filter 230 are spectrally filtered by transmission through the at least one filter material 232 (e.g., a first portion of the x-rays transmitted through the at least one filter material 232 and a second portion of the x-rays absorbed by the at least one filter material 232). The at least one filter material 232 has a thickness (e.g., in a range of 1 micron to 10 microns; about 5 microns) configured to allow the first portion of the impinging x-rays to propagate through the at least one filter material 222 while absorbing the second portion of the impinging x-rays. For example, the at least one filter material 232 can have a high x-ray transmission for x-rays with energies between the L absorption edges of Ag and Sn and a low x-ray transmission for x-rays with energies above the L absorption edge of Sn. Examples of such filter materials 232 include but are not limited to Sn-containing materials (e.g., SnO). Filtering by the at least one filter material 232 can lead to an increased strength (e.g., intensity) of Ag L x-ray lines relative to Sn L x-ray lines in the fluorescence x-rays 142 generated by SnAg solder structures of the sample 10 and received by the at least one detector 140. While FIG. 1B shows the at least one filter 230 between the x-ray source 120 and the x-ray optic 130, the at least one filter 230 can be a component of the x-ray source 120 (e.g., at least a portion of an exit window of the x-ray source 120) and/or of the at least one x-ray optic 130.

In certain implementations, the at least one target 210 comprises a thermally conductive and electrically conductive substrate 220 comprising at least one substrate material 222 (e.g., diamond; copper) and the at least one target material 122 comprises at least one layer on and in thermal communication with the substrate 220. For example, an electrically insulative target material 122 can be in thermal contact with the at least one substrate material 222 having a high thermal conductivity (e.g., sufficiently high to transfer heat away from the target material 122 to substantially reduce or avoid thermal damage to the target material 122). The at least one substrate material 222 of certain implementations comprises a low atomic number material, examples of which include but are not limited to: diamond which comprises carbon; beryllium; sapphire which comprises aluminum and oxygen. Other examples of the at least one substrate material 222 include but are not limited to copper.

In certain implementations in which the at least one target material 122 is electrically insulative (e.g., ceramic; glass), the at least one target material 122 is directly adhered to the substrate material 222. For example, the at least one electrically insulative target material 122 can comprise a thin layer (e.g., having a thickness in a range of 1 micron to 10 microns) in direct contact with the diamond substrate material 222. In certain other implementations in which the at least one electrically insulative target material 122 is on a diamond substrate material 222, the x-ray target 210 further comprises at least one intermediate layer 224 between the at least one target material 122 and the diamond substrate material 222 (e.g., providing adhesion between the at least one target material 122 and the diamond substrate material 222 and/or providing protection against diffusion of the at least one target material 122 into the diamond substrate material 222). For example, the at least one electrically insulative target material 122 can have a thickness in a range of 1 micron to 10 microns (e.g., 1 micron to 3 microns; 3 microns to 5 microns; 5 microns to 10 microns), and the at least one intermediate layer 224 can have a thickness in the range of 1 nanometer to 100 nanometers (e.g., 1 nanometer to 30 nanometers; 30 nanometers to 100 nanometers). In certain implementations, the at least one intermediate layer 224 comprises at least one atomic element that has good wetting properties to the at least one electrically insulative target material 122 and to the diamond substrate material 222 (e.g., titanium (Ti)).

In certain implementations, the at least one electrically insulative target material 122 is configured to not substantially charge up upon being impinged by the electron beam 202 of the x-ray source 120. For example, the at least one electrically insulative target material 122 can have a thickness less than or equal to 10 microns such that substantial charge leakage from the top of the at least one electrically insulative target material 122 to the underlying electrically conductive diamond substrate material 222 can occur. For another example, the at least one electrically insulative target material 122 can have a thickness greater than 10 microns and can be positioned within trenches (e.g., 3 microns wide) on the top surface of the diamond substrate material 222. The top of the at least one electrically insulative target material 122 can be sufficiently close to the surrounding top surface of the diamond substrate material 222 such that substantial charge leakage from the at least one electrically insulative target material 122 to the neighboring electrically conductive diamond substrate material 222 can occur.

In certain implementations, the at least one target 210 further comprises a coating (e.g., top layer; sealant layer; not shown) over the at least one target material 122, the coating comprising a different, low atomic number material (e.g., carbon; boron carbide) than the at least one target material 122. In certain implementations, the at least one target material 122 is deposited onto the underlying structure (e.g., the substrate material 222; the intermediate layer 224) by sputtering or any other thin film deposition approaches known to those versed in the art.

In certain implementations, the at least one target material 122 comprises at least one atomic element having at least one third characteristic x-ray line with an energy between the first and second energies of the first and second atomic elements of the sample 10. The x-rays 124 generated by the at least one target material 122 and received by the at least one x-ray optic 130 can comprise x-rays of the at least one third characteristic x-ray line.

In certain implementations, the takeoff angle for the x-rays 124 generated by the at least one target material 122 of the x-ray source 120 and received by the x-ray optic 130 can be in the range of: 1 degree to 30 degrees (e.g., 1 degree to 6 degrees; 6 degrees to 15 degrees; 15 degrees to 30 degrees). For example, the take-off angle for the at least one target material 122 can be higher than that for target materials comprising pure metals (e.g., greater than 6 degrees). For low characteristic energies of interest, self-attenuation can reduce the amount of generated x-rays 124 that propagate from the x-ray source 120 to the x-ray optic 130.

X-Ray Optic

In certain implementations, the at least one x-ray optic 130 is configured to focus at least some of the x-rays 124 generated by the x-ray source 120 at the sample 10 (e.g., within the sample 10; on a surface of the sample 10). The optical surface profile of the at least one x-ray optic 130 can be quadric. Examples of such focusing x-ray optics 130 include but are not limited to: pairs of (e.g., double) paraboloidal capillary optics; ellipsoidal demagnifying capillary optics; polycapillary optics. For example, the at least one x-ray optic 130 can comprise a capillary with a glass substrate and can be coated with a high atomic number material (e.g., platinum).

Demagnifying optics can be used for XRF analysis of solder bumps (e.g., microbumps) with sizes in a range of 15 microns to 30 microns (e.g., 20 microns to 25 microns). With an x-ray source 120 having a spot size of 12 microns to 20 microns, a demagnifying x-ray optic 130 can focus the x-ray beam 132 at the sample 10 to have a spot size in the range of 3 microns to 12 microns while maintaining high x-ray flux. In certain implementations, the demagnifying x-ray optic 130 is configured to demagnify by a ratio in a range of 2:1 to 10:1 (e.g., 4:1, 6:1, 7:1).

In certain implementations, the at least one x-ray optic 130 has a curvature such that x-rays 124 received by the x-ray optic 130 having energies below a predetermined cut-off energy undergo total external reflection and are directed (e.g., reflected) to propagate towards the sample 10 as the x-ray beam 132, while x-rays 124 with energies above the predetermined cut-off energy are not directed to propagate towards the sample 10. The critical angle of external reflection can be approximated as:

$$\theta_C = \frac{30}{E} * \frac{\sqrt{Z}}{\sqrt{Z_{Si}}},$$

where E is the x-ray energy in keV, Z is the atomic number of the surface coating (e.g., Pt, Jr, Rh, Au, etc.) of the x-ray optic 130, and $Z_{Si}$ is the atomic number of silicon and is equal to 14. The cut-off energy can also be measured as the x-ray energy below which x-rays that are incident upon the surface of the x-ray optic 130 have a reflectivity that is approximately equal to one. In certain other implementations, the reflectivity for x-rays having energies below the cut-off energy is above a predetermined threshold (e.g., above 90%, in a range of 80% to 90%, in a range of 50% to 80%).

The predetermined cut-off energy can be lower than the absorption edge energy associated with the second characteristic x-ray line (e.g., the characteristic x-ray line of the first and second atomic elements of the sample 10 with the higher energy). In certain implementations, the cut-off energy decreases both the background contribution of the XRF spectra received by the at least one x-ray detector 140 and the probability that the second atomic element (e.g., the atomic element with the higher characteristic x-ray line energy) is excited by the x-ray beam 132. Decreasing the background in the XRF spectra can result in a higher signal-to-noise ratio, which can be helpful for quantifying trace elements.

X-Ray Detector

In certain implementations, the at least one x-ray detector 140 comprises an energy dispersive detector (e.g., having an optimal energy resolution less than 180 eV), while in certain other implementations, the at least one x-ray detector 140 comprises a wavelength dispersive spectrometer (e.g., comprising a crystal monochromator and an x-ray detecting element; having an energy resolution lower than 5 eV). In certain implementations, the energy dispersive detector comprises a silicon drift detector (SDD). In certain implementations in which the at least one x-ray detector 140 comprises an energy dispersive detector, XRF signals (e.g., counts) from multiple atomic elements can be acquired concurrently. In certain implementations, the at least one x-ray detector 140 can comprise a first wavelength dispersive detector for detecting XRF signals from the first atomic element (e.g., the first characteristic x-ray line) and a second wavelength dispersive detector for detecting XRF signals from the second atomic element (e.g., the second characteristic x-ray line). Certain such implementations can improve the detection of the minor atomic element (e.g., the atomic element of the first and second atomic elements with the lesser concentration within the sample 10). In certain other implementations, a single wavelength dispersive detector can be used by switching between detection angles (e.g., angles relative to the sample 10 over which XRF signals are detected) to acquire XRF signals from both the first and second characteristic x-ray lines from the first and second atomic elements.

Example Method

Figure 2A:
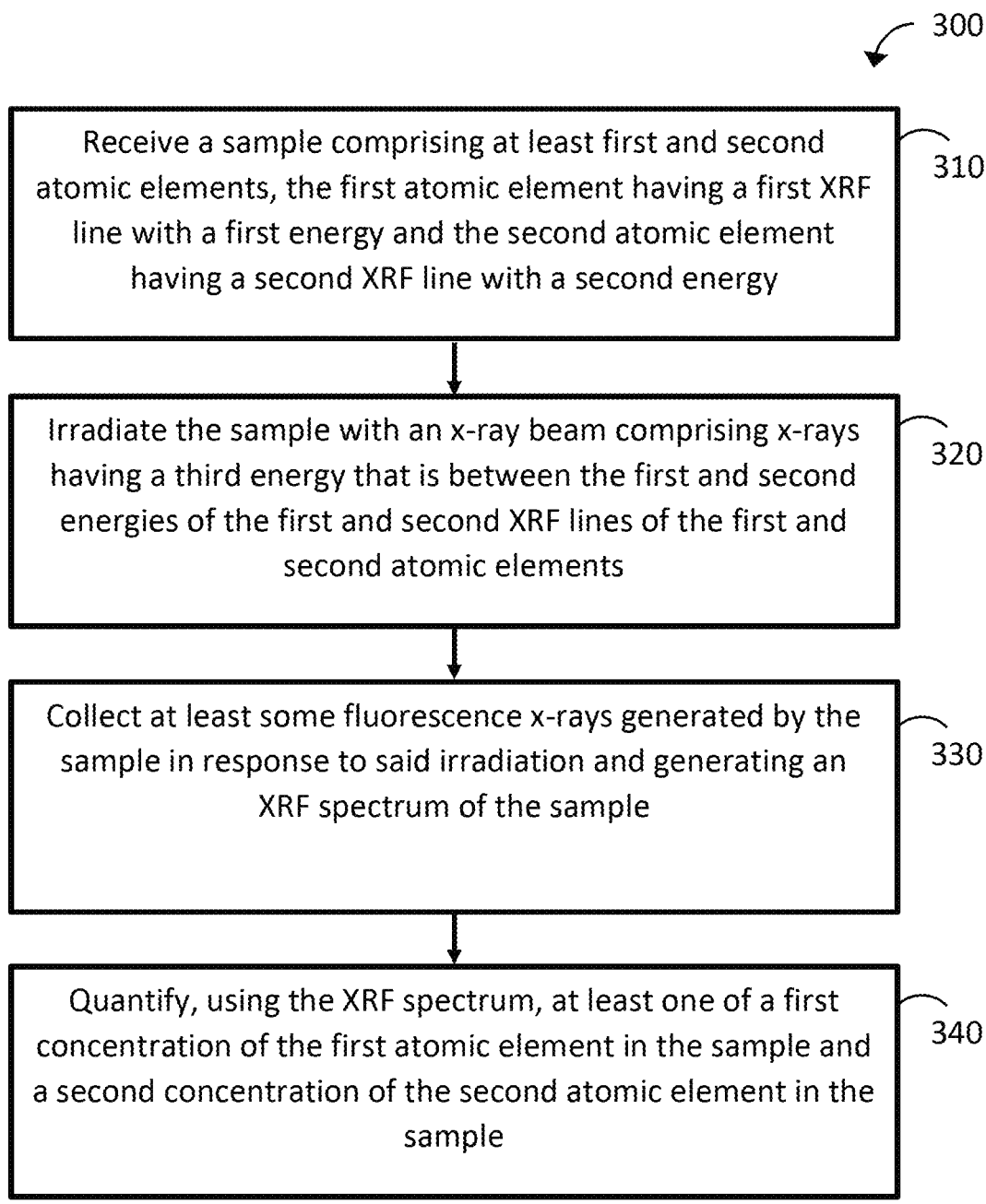
FIGS. 2A and 2B are flow diagrams of two examples of a method for analyzing a sample in accordance with certain implementations described herein.
Figure 2B:
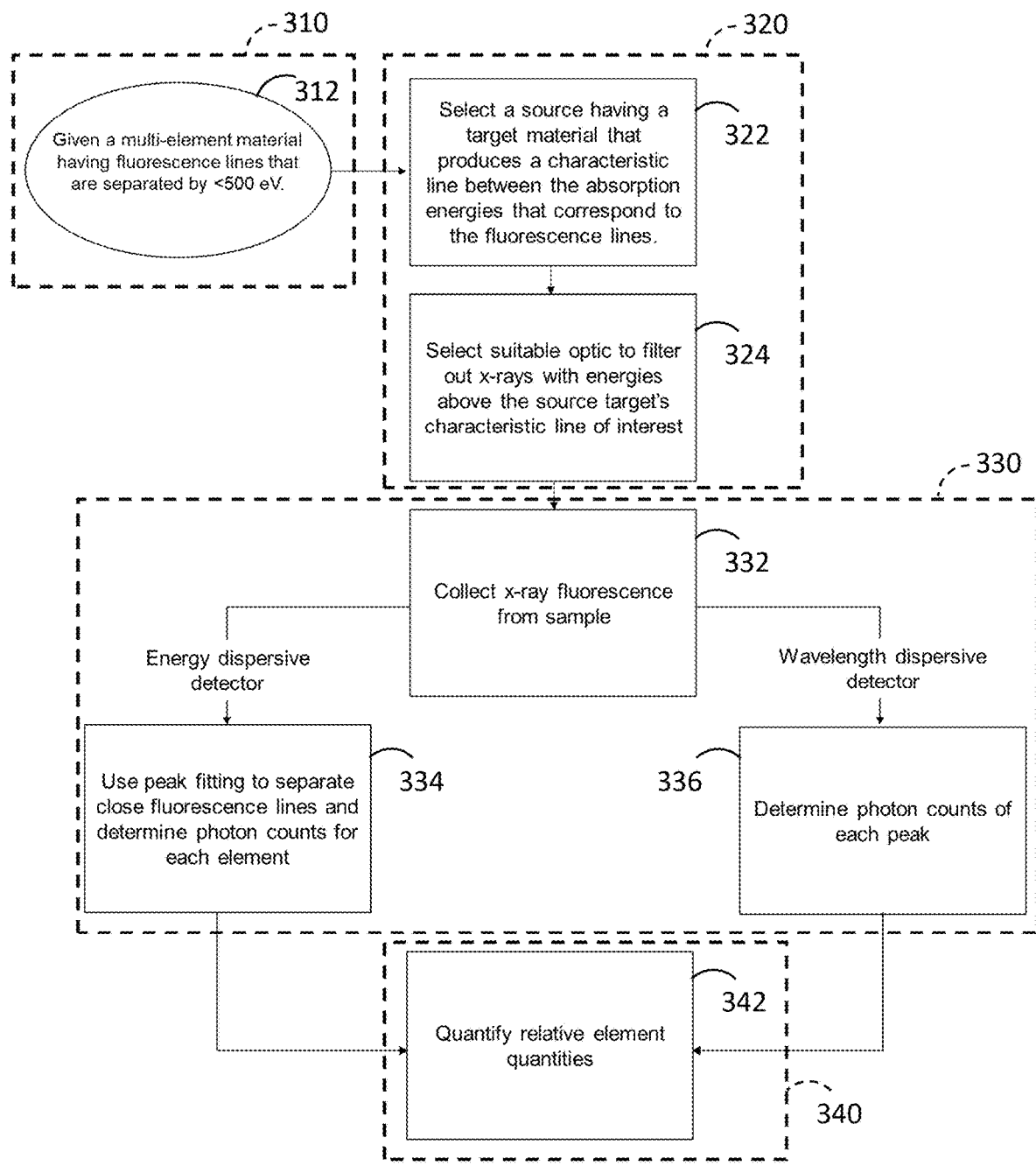

FIGS. 2A and 2B are flow diagrams of two examples of a method 300 for analyzing a sample in accordance with certain implementations described herein. While the examples of the method 300 is described herein by referring to the example system 100 of FIGS. 1A-1B, other systems and apparatuses are also compatible with the examples of the method 300 in accordance with certain implementations described herein.

In an operational block 310, the method 300 comprises receiving a sample 10 comprising at least first and second atomic elements (e.g., co-located within 50 microns of one another within the sample 10). The first atomic element has a first characteristic XRF line with a first energy and the second atomic element has a second characteristic XRF line with a second energy. In certain implementations, at least one of the first and second characteristic XRF lines is an L-line or an M-line. The second energy is greater than the first energy by an energy difference. For example, the first energy and the second energy can be in a range of less than or equal to 5 keV (e.g., less than or equal to 4 keV) and/or the energy difference can be in an energy range of less than or equal to 1000 eV (e.g., less than or equal to 100 eV; less than or equal to 200 eV; less than or equal to 500 eV). For example, as shown in FIG. 2B, said receiving can comprise an operational block 312 comprising being given a multi-element material (e.g., a wafer comprising SnAg solder bumps) having XRF lines that are separated by less than 500 eV. The first characteristic XRF line corresponds to a first absorption edge and the second characteristic XRF line corresponds to a second absorption edge. In certain implementations, the first and second atomic elements, the first and second characteristic XRF lines, and the first and second absorption edges are predetermined prior to performing the method 300. In certain implementations, one of the first and second atomic elements comprises at least 90% of the composition of the sample by weight. In certain implementations, a ratio of one of the first and second atomic elements to the other of the first and second atomic elements is in a range of greater than or equal to 5:1.

In an operational block 320, the method 300 further comprises irradiating the sample 10 with an x-ray beam 132 comprising x-rays having a third energy that is between the first and second energies of the first and second characteristic XRF lines (e.g., more than 40% of the x-ray beam 132 consisting of x-rays having the third energy). For example, said irradiating can comprise using at least one x-ray optic 130 to receive x-rays 124 comprising the x-rays having the third energy, to focus or collimate at least some of the received x-rays 124 into the x-ray beam 132, and to direct the x-ray beam 132 towards the sample 10. The at least one x-ray optic 130 can have a cut-off energy that is less than an energy of the second absorption edge.

For example, as shown in FIG. 2B, said irradiating can comprise an operational block 322 comprising selecting an x-ray source 120 having at least one target material 122 configured to generate the x-rays 124 having the third energy in response to electron bombardment of the at least one target material 122. For example, the third energy can be a characteristic line of the at least one target material 122. Said irradiating can further comprise an operational block 324 comprising selecting the at least one x-ray optic 130 to filter out x-rays with energies above the third energy (e.g., x-rays of the characteristic x-ray line of the target material 122).

In an operational block 330, the method 300 further comprises collecting at least some fluorescence x-rays generated by the sample 10 in response to said irradiating and generating an XRF spectrum of the sample 10 in response to said collecting. For example, as shown in FIG. 2B, said collecting comprises an operational block 332 comprising collecting at least some fluorescence x-rays 142 from the sample 10 (e.g., using at least one x-ray detector 140). If an energy dispersive detector is used to collect the fluorescence x-rays 142, said collecting can further comprise an operational block 334 which comprises performing peak fitting to the XRF spectrum. The peak fitting can comprise separating close XRF lines of the XRF spectrum and determining photon counts for each of the first and second atomic elements. If a wavelength dispersive detector is used to collect the fluorescence x-rays 142, said collecting can further comprise an operational block 336 which comprises determining photon counts of each peak of the XRF spectrum.

In an operational block 340, the method 300 further comprises quantifying, using the XRF spectrum, at least one of a first concentration of the first atomic element in the sample 10 and a second concentration of the second atomic element in the sample 10. For example, as shown in FIG. 2B, said quantifying can comprise quantifying relative quantities of the first and/or second atomic elements.

Example Implementation: Ca-Containing Target Material

In certain implementations, the x-ray source 120 comprises a target material 122 comprising at least one Ca-containing material (e.g., $CaB_6$, pure Ca, CaO) in thermal contact with a diamond substrate material 222. The at least one Ca-containing material is configured to produce Ca K$\alpha$ line x-rays 124 with an energy of 3.69 keV, which is between the Sn absorption edge and most of the Ag L absorption edges. $CaB_6$ has a high melting point (e.g., about 2235° C.).

In certain implementations in which small spot analysis or high resolution mapping of Ag concentration in SnAg solder bumps is to be performed, the at least one x-ray optic 130 comprises an x-ray focusing optic 130 with a wide spectral band and configured to receive the x-rays 124 emitted from the x-ray source 120 and to focus at least some of the x-rays 124 as an x-ray beam 132 onto the sample 10. For example, the x-ray focusing optic 130 can comprise a capillary mirror lens with a quadric (e.g., ellipsoidal) inner surface profile. The x-ray focusing optic 130 can provide a high percentage of Ca K line x-rays for efficient production of Ag L x-ray lines from the sample 10 while providing Sn L x-ray lines with Bremsstrahlung radiation of energies above the Sn L absorption edge. The x-ray reflections from the capillary mirror lens and/or the electron acceleration voltage impacting on the at least one target 210 can be configured to optimize the fluorescence x-ray spectra from the sample 10 so that the Ag Lα and Sn Lα x-ray lines have comparable (e.g., substantially equal) intensities but with substantially larger intensities than does the Sn Lγ x-ray line. For a target material 122 comprising an electrically insulative Ca-containing material (e.g., having a low electrical conductivity), an electrically conductive path can be provided from the target material 122 to the underlying substrate 220 and from the substrate 220 to ground to avoid charging of the target 210.

Once the XRF spectrum is collected, the data can be processed through a peak fitting algorithm which can take into account the relative peak intensities of the other L x-ray lines with respect to the Ag Lα x-ray line. The peak fitting algorithm can also be applied to the K x-ray lines if these x-ray lines are acquired. Relative weight or atomic percentages of elements can then be calculated (e.g., using a fundamental parameters model based on the x-ray source, x-ray optics, and geometries of various components).

Example Implementation: Barium Titanium Analyzer

For certain samples 10 (e.g., multilayer ceramic capacitors), XRF from barium (Ba) and titanium (Ti) can be of interest. Ba has an Lα x-ray line with an energy of 4.466 keV and Ti has a Kα x-ray line with an energy of 4.512 keV. In certain implementations, the Ba L1, L2, and L3 absorption edges are at 5.989 keV, 5.624 keV, and 5.247 keV, respectively, and the Ti K absorption edge is at 4.966 keV. In certain implementations, an x-ray target material 122 can be used to generate x-rays 124 with a characteristic x-ray line energy between the Ti K-edge and one or more of the Ba L edges. For example, an x-ray source target material 122 comprising Cr can be used to produce x-rays 124 with characteristic Kα x-ray energy of 5.4149 keV.

In certain such implementations, a dual energy approach can be used. For example, a first x-ray source target material 122 comprising Cr with a first characteristic x-ray energy (e.g., 5.4149 keV) can be used in conjunction with a first x-ray optic 130 with a first cut-off energy (e.g., 5.5 keV) to excite Ba L3 and Ti K x-ray lines. A second x-ray source target material 122 (e.g., comprising Cu) with a second characteristic x-ray energy (e.g., 8.04 keV) can then be used in conjunction with a second x-ray optic 130 having a second cut-off energy that excites all Ba and Ti x-ray lines. By peak fitting to the higher (e.g., non-excited) Ba absorption edges (e.g., Ba L2 and L3 emission x-ray lines), the intensity of the Ba L3 x-ray line can be determined, and the intensity of the Ti K x-ray line can be determined by subtracting the expected intensity of the Ba L3 x-ray line.

Example X-Ray Spectra

Figure 3:
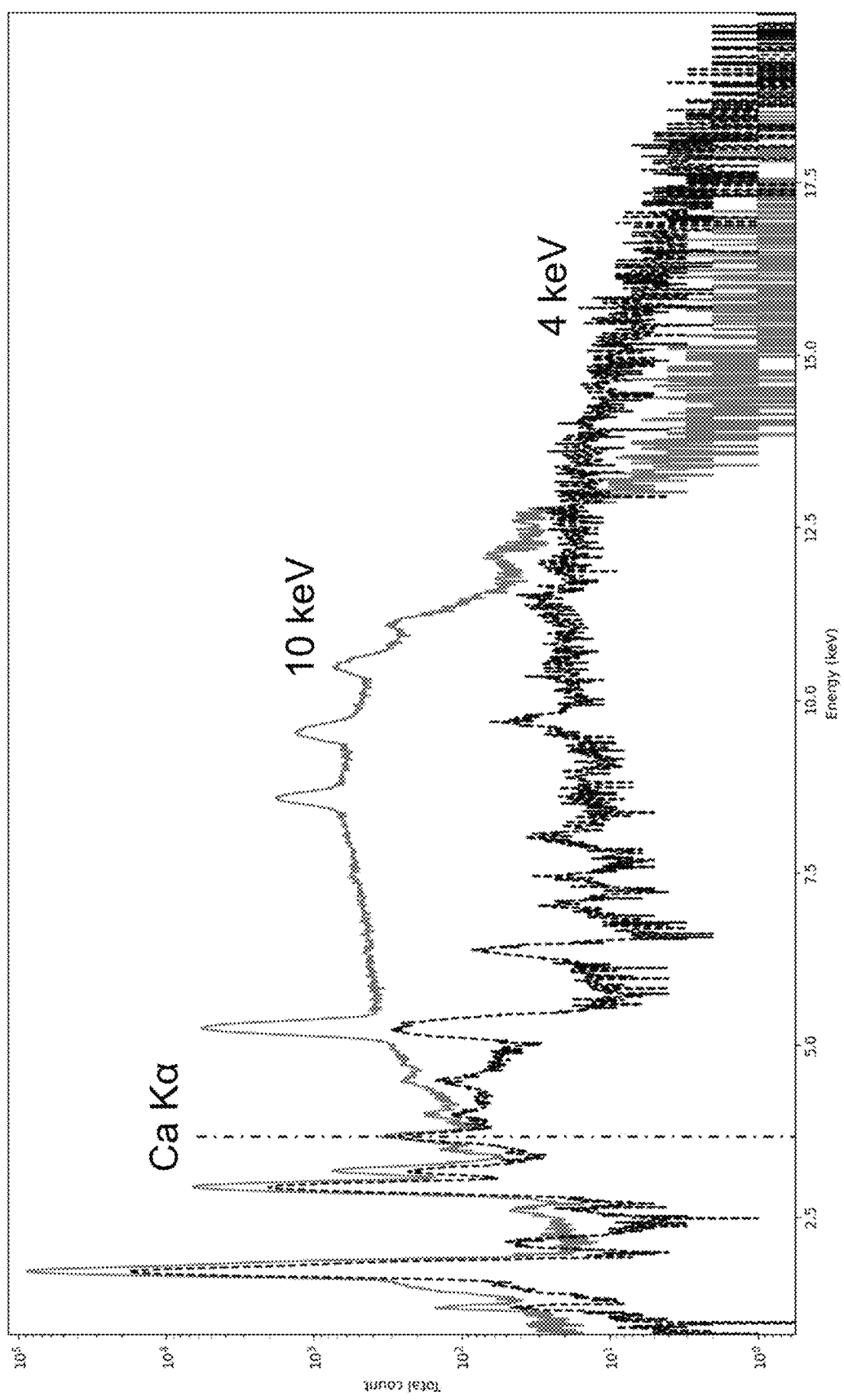
FIG. 3 shows two XRF spectra from about zero to about 20 keV of a silicon (Si) sample irradiated by two different excitation x-ray beams.

FIG. 3 shows two XRF spectra from about zero to about 20 keV of a silicon (Si) sample 10 irradiated by two different excitation x-ray beams 132. The excitation x-ray beams 132 were generated by an x-ray source 120 having a $CaB_6$ target material 122 paired with (i) an x-ray optic 130 having a high reflectivity (e.g., greater than 50%; greater than 70%) below 10 keV and (ii) an x-ray optic 130 having a high reflectivity below 4 keV. The x-ray source 120 was operated at 20 kVp with an electron beam current of 1500 microamps. X-rays above 4 keV contribute to higher background in the low energy regime due to incomplete charge collection by the silicon drift detector.

Figure 4:
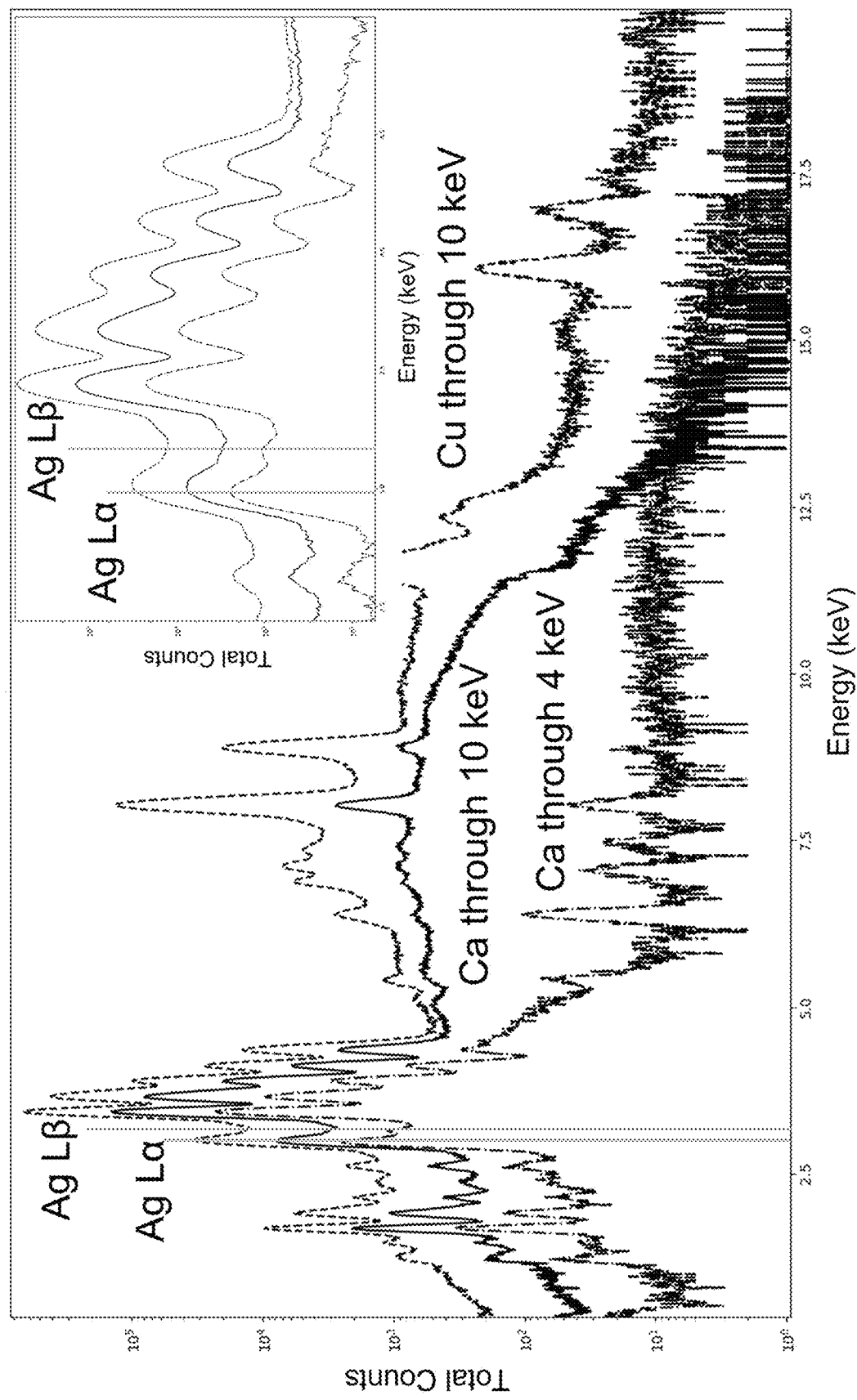
FIG. 4 shows three XRF spectra from about zero to about 20 keV of a silver (Ag) sample irradiated by three different excitation x-ray beams.

FIG. 4 shows three XRF spectra from about zero to about 20 keV of a silver (Ag) sample 10 irradiated by three different excitation x-ray beams 132. The excitation x-ray beams 132 were generated by an x-ray source 120 having (i) a $CaB_6$ target material 122 paired with an x-ray optic 130 having a high reflectivity (e.g., greater than 50%; greater than 70%) below 10 keV, (ii) a $CaB_6$ target material 122 paired with an x-ray optic 130 having a high reflectivity below 4 keV, and (iii) a Cu target material 122 paired with an x-ray optic 130 having a high reflectivity below 10 keV. The inset of FIG. 4 is an expanded view of the spectral region from about 2.5 keV to about 5 keV of the XRF spectra, which includes the Ag Lα and Lβ lines. The insert shows that the Ag Lβ XRF line can most clearly be seen using the $CaB_6$ target material 122 paired with the x-ray optic 130 having a high reflectivity below 4 keV.

Figure 5:
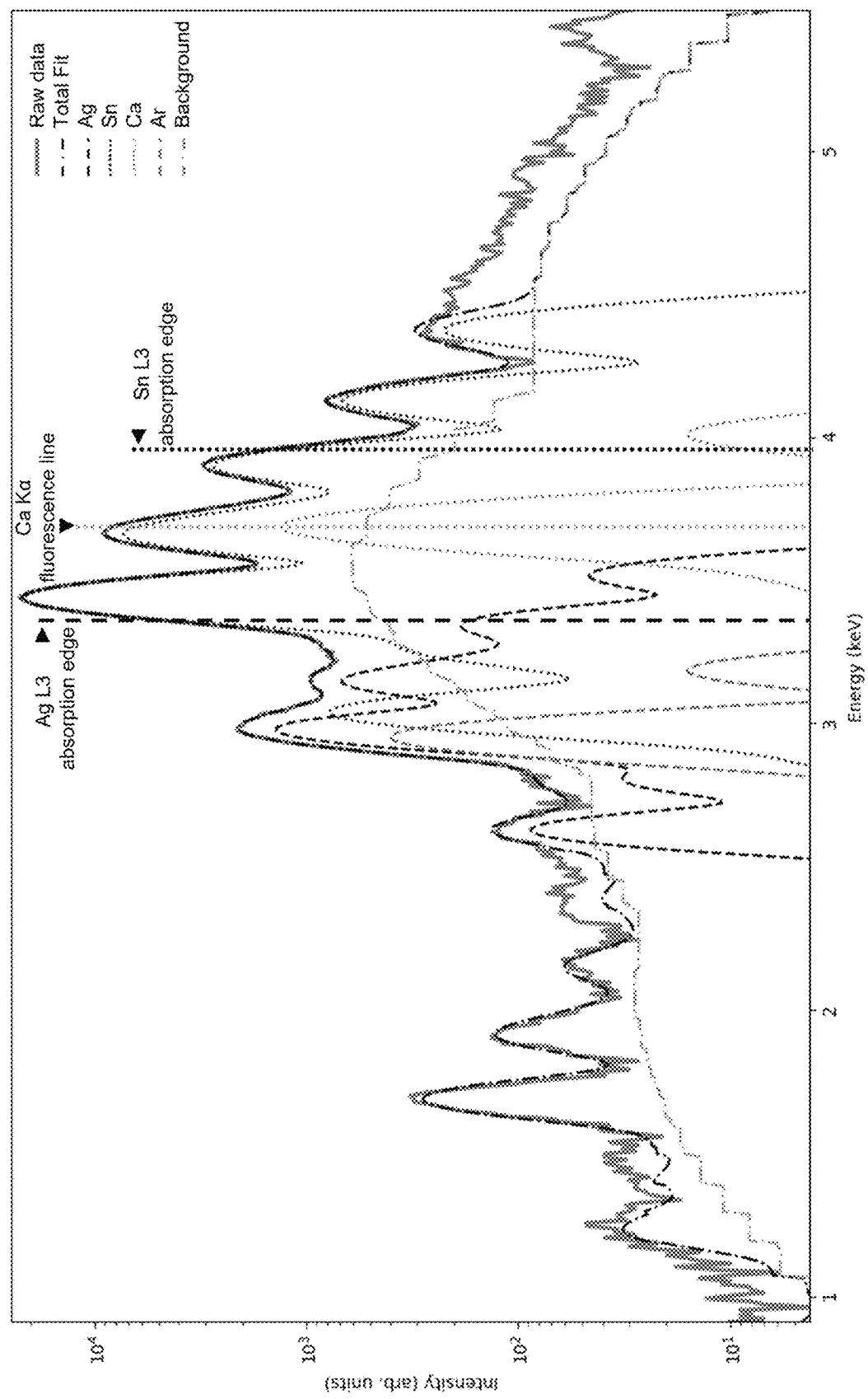
FIG. 5 shows an XRF spectrum from about 0.5 keV to about 6.5 keV acquired from a sample comprising SnAg solder microbumps in accordance with certain implementations described herein.

FIG. 5 shows an XRF spectrum from about 0.5 keV to about 6.5 keV acquired from a sample 10 comprising SnAg solder microbumps in accordance with certain implementations described herein. The excitation x-ray beam 132 was generated by a system 100 having a $CaB_6$ target material 122 and a He flush. The vertical dashed lines denote the Ag L3 absorption edge energy, the fluorescence Ca Kα line energy, and the Sn L3 absorption edge energy. FIG. 5 demonstrates that the fluorescence Ca Kα line energy is between the Ag L3 absorption edge energy and the Sn L3 absorption edge energy and demonstrates clear Ag Lα and Lβ peaks.

Figure 6:
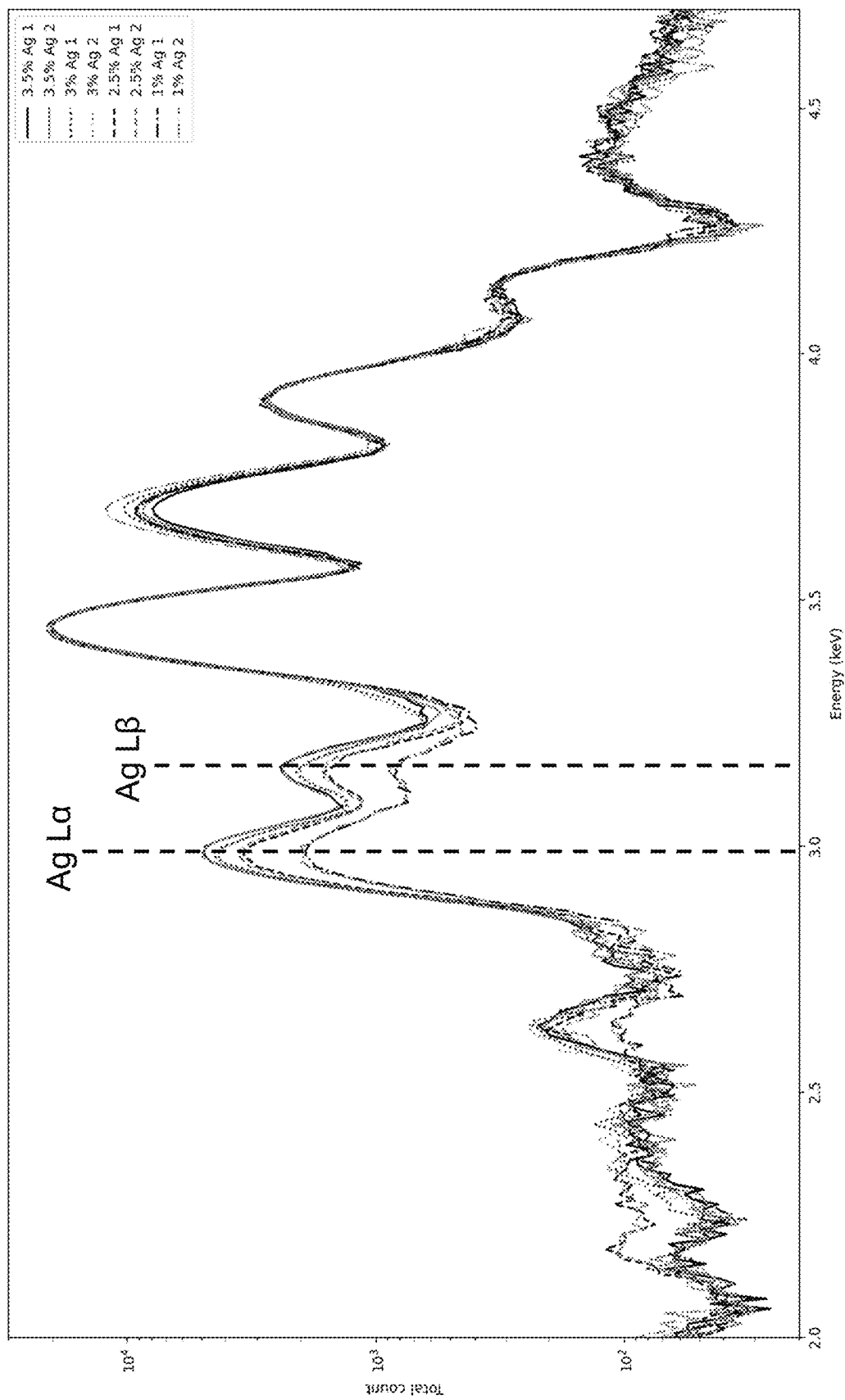
FIG. 6 shows an expanded view of the spectral region from about 2 keV to about 4.7 keV of the XRF spectra acquired from samples comprising SnAg solder microbumps with standardized Ag concentrations in accordance with certain implementations described herein.

FIG. 6 shows an expanded view of the spectral region from about 2 keV to about 4.7 keV, which includes the Ag Lα and Lβ lines, of the XRF spectra acquired from samples 10 comprising SnAg solder microbumps with standardized Ag concentrations (e.g., standard Ag %) in accordance with certain implementations described herein. The excitation x-ray beam 132 was generated by a system 100 having a $CaB_6$ target material 122 and an 12 kVp, 10 W electron beam 202. The XRF spectra were acquired with an acquisition time of 300 seconds per point.

Using the XRF spectra of FIG. 6, the Ag concentration percentages were calculated using a fundamental parameters (FP) model. Table 1 shows a comparison of the standardized Ag concentrations of the samples 10 to the FP-estimated Ag % from the XRF spectra of FIG. 6.

TABLE 1

| Standard Ag % | FP-estimated Ag % |
|---|---|
| 1.002 | 0.9719 |
| 1.002 | 0.9386 |
| 2.47 | 2.1374 |

TABLE 1-continued

| Standard Ag % | FP-estimated Ag % |
|---|---|
| 2.47 | 2.1061 |
| 3.07 | 2.8889 |
| 3.07 | 2.7833 |
| 3.50 | 3.2249 |
| 3.50 | 3.2927 |

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," "less than," "between," and the like includes the number recited. As used herein, the meaning of "a," "an," and "said" includes plural reference unless the context clearly dictates otherwise. Also, as used in the description herein, the meaning of "in" includes "into" and "on," unless the context clearly dictates otherwise.

While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. In addition, although the disclosed methods and apparatuses have largely been described in the context of various devices, various implementations described herein can be incorporated in a variety of other suitable devices, methods, and contexts.

Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. A system comprising:
    a stage configured to support a sample comprising at least first and second atomic elements, the first atomic element having a first characteristic x-ray line with a first energy, the second atomic element having a second characteristic x-ray line with a second energy, the second energy greater than the first energy, the first energy and the second energy lower than 8 keV and separated from one another by less than 1 keV;
    an x-ray source comprising at least one target material configured to produce x-rays having a third energy between the first and second energies;
    at least one x-ray optic configured to receive and focus at least some of the x-rays from the x-ray source as an x-ray beam to illuminate the sample, the x-ray beam having a spot size at the sample in a range of 1 micron to 25 microns, at least 70% of the x-ray beam having x-ray energies that are below the second energy; and
    at least one x-ray detector configured to detect fluorescence x-rays produced by the sample in response to being irradiated by the x-ray beam.

2. The system of claim 1, wherein the at least one x-ray optic has a cut-off energy that is in a range 50% to 100% of an absorption edge energy associated with the second characteristic x-ray line.

3. The system of claim 1, wherein the first and second energies are separated from one another by less than 500 eV.

4. The system of claim 1, wherein the first and second atomic elements are silver and tin, and the sample comprises solder.

5. The system of claim 4, wherein the at least one x-ray detector is configured to measure an amount of silver in the sample.

6. The system of claim 1, wherein the at least one target material is an electrically insulating material.

7. The system of claim 6, wherein the electrically insulating material comprises a ceramic material.

8. The system of claim 1, wherein the at least one target material comprises at least one third atomic element having at least one third characteristic x-ray line with the third energy.

9. The system of claim 1, further comprising a spectral filter configured to be impinged by the x-rays produced by the at least one target material, the spectral filter comprising the second atomic element.

10. The system of claim 9, wherein the spectral filter comprises a compound of Ca.

11. The system of claim 9, wherein the spectral filter is positioned between the at least one target material and the at least one x-ray optic.

12. The system of claim 1, wherein the target material comprises an electrically insulating target material having a thickness less than 10 microns, the target material configured to emit x-rays upon being impinged by electrons accelerated by an accelerating voltage in a range of 5 kVp to 30 kVp, the x-ray source further comprising a diamond substrate material in thermal communication with the target material, the diamond substrate material configured to transfer heat away from the target material, the heat generated by the target material being impinged by the electrons.

13. The system of claim 12, wherein the x-ray source further comprises an intermediate layer between the target material and the diamond substrate material, the intermediate layer comprising a material different from the target material and the diamond substrate material.

14. The system of claim 13, wherein the intermediate layer has a thickness less than 100 nanometers.

15. The system of claim 12, wherein the target material comprises at least one Ca-containing material.

16. The system of claim 12, wherein the target material comprises a ceramic material.

17. The system of claim 12, further comprising a coating over the target material.

18. The system of claim 12, further comprising at least one x-ray optic configured to receive at least some of the x-rays emitted from the target material and to focus or collimate the received x-rays into an excitation x-ray beam directed to impinge a sample.

19. The system of claim 18, wherein the received x-rays have a takeoff angle in a range of 1 degree to 30 degrees.

20. The system of claim 1, wherein the spot size at the sample is in a range of 3 microns to 20 microns.

21. The system of claim 1, wherein the x-ray optic is configured to demagnify the x-ray beam by a ratio in a range of 2:1 to 10:1.

* * * * *